United States Patent
Takahashi

(10) Patent No.: US 8,243,148 B2
(45) Date of Patent: Aug. 14, 2012

(54) IMAGE PROCESSING DEVICE

(75) Inventor: Fuminori Takahashi, Nagano (JP)

(73) Assignee: Nittoh Kogaku K.K., Nagano (JP)

( * ) Notice: Subject to any disclaimer, the term of this patent is extended or adjusted under 35 U.S.C. 154(b) by 1083 days.

(21) Appl. No.: 12/159,467

(22) PCT Filed: Dec. 20, 2006

(86) PCT No.: PCT/JP2006/325330
§ 371 (c)(1),
(2), (4) Date: Jun. 27, 2008

(87) PCT Pub. No.: WO2007/077733
PCT Pub. Date: Jul. 12, 2007

(65) Prior Publication Data
US 2010/0220203 A1    Sep. 2, 2010

(30) Foreign Application Priority Data
Dec. 28, 2005  (JP) ................................. 2005-378587

(51) Int. Cl.
*H04N 5/228* (2006.01)
(52) U.S. Cl. ................ 348/208.4; 348/208.5; 348/222.1; 348/223.1
(58) Field of Classification Search ............... 348/208.4, 348/208.5, 222.1, 223.1; 382/268, 275, 305, 382/312
See application file for complete search history.

(56) References Cited

U.S. PATENT DOCUMENTS

| | | | | |
|---|---|---|---|---|
| 3,868,704 A | * | 2/1975 | Yamada et al. | 396/250 |
| 5,444,509 A | | 8/1995 | Ohishi | |
| 2002/0167597 A1 | * | 11/2002 | Nakano et al. | 348/223.1 |

FOREIGN PATENT DOCUMENTS

| | | |
|---|---|---|
| JP | 06-317824 A | 11/1994 |
| JP | 11-024122 A | 1/1999 |
| JP | 2000298300 | 10/2000 |
| JP | 2002-300459 A | 10/2002 |
| JP | 2003-060916 A | 2/2003 |

OTHER PUBLICATIONS

Japanese Patent Office Action; Issued Aug. 30, 2011; corresponding Japanese Patent Application No. JP2007-552900; with English translation.

\* cited by examiner

*Primary Examiner* — Yogesh Aggarwal
(74) *Attorney, Agent, or Firm* — Cowan, Liebowitz & Latman, P.C.; Mark Montague, Esq.

(57) ABSTRACT

An image processing device that produces a restored image that gives people natural feeling when a shot image with longer exposure time on the way to image blurring due to hand jiggling or an end portion is restored. The image processing device comprises an image processing unit that produces a restored image approximated to an original image from an object image to be processed, which is fluctuated against the original image due to movement of an image shooting device during exposure. The image processing unit produces the restored image while making the restored image correspond to a position having the longest exposure time for an object image to be processed.

1 Claim, 25 Drawing Sheets

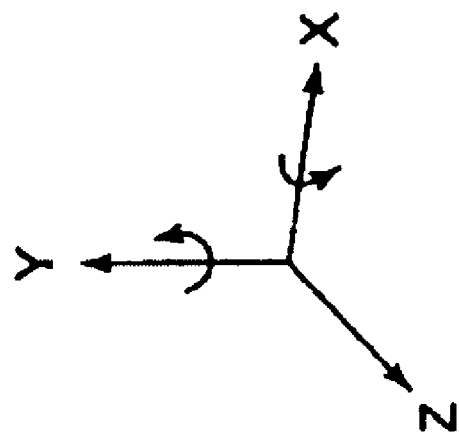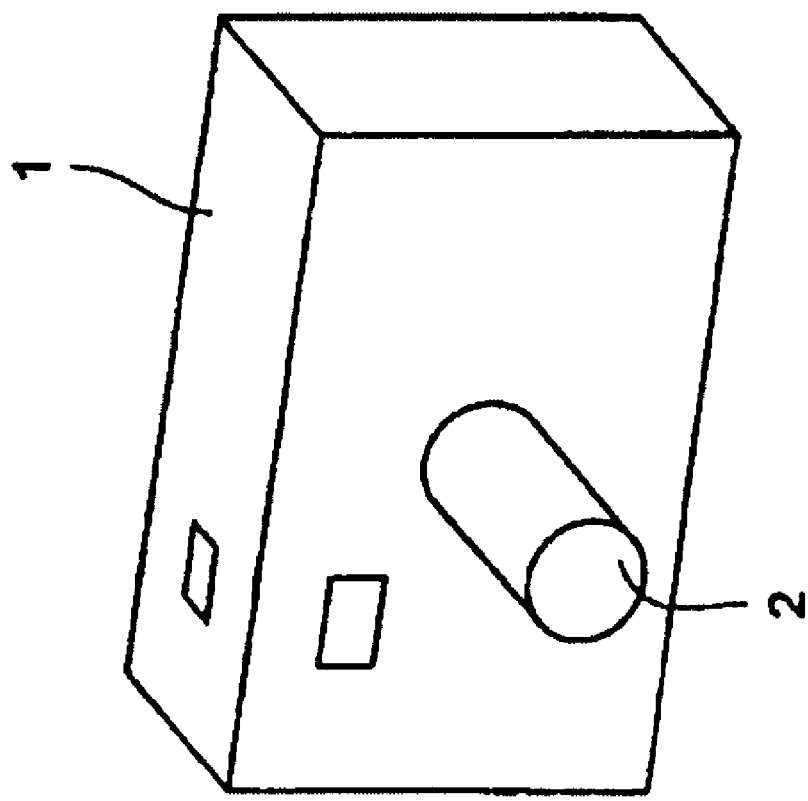
Fig.2

(A)
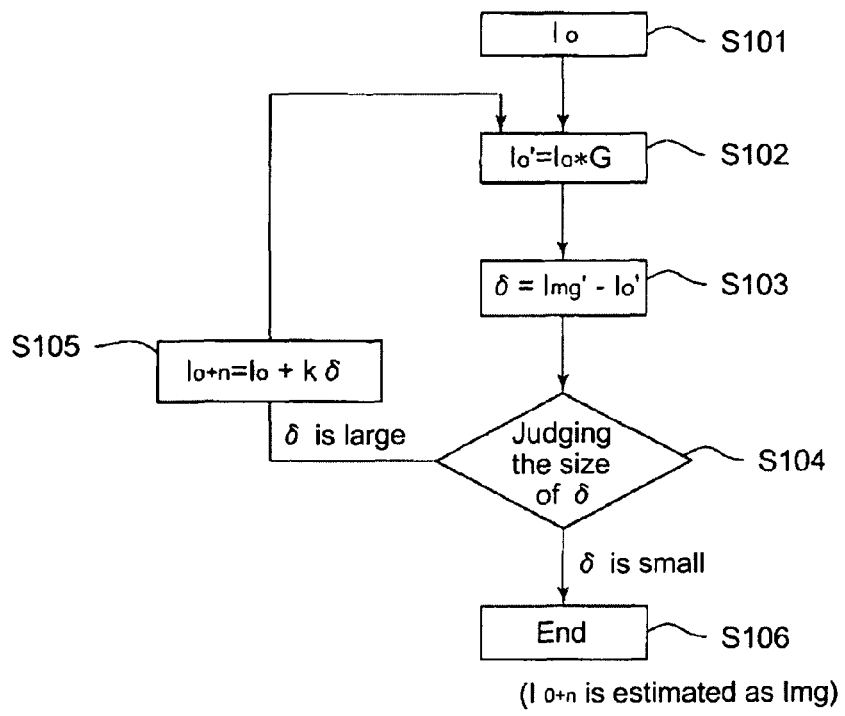
(B)
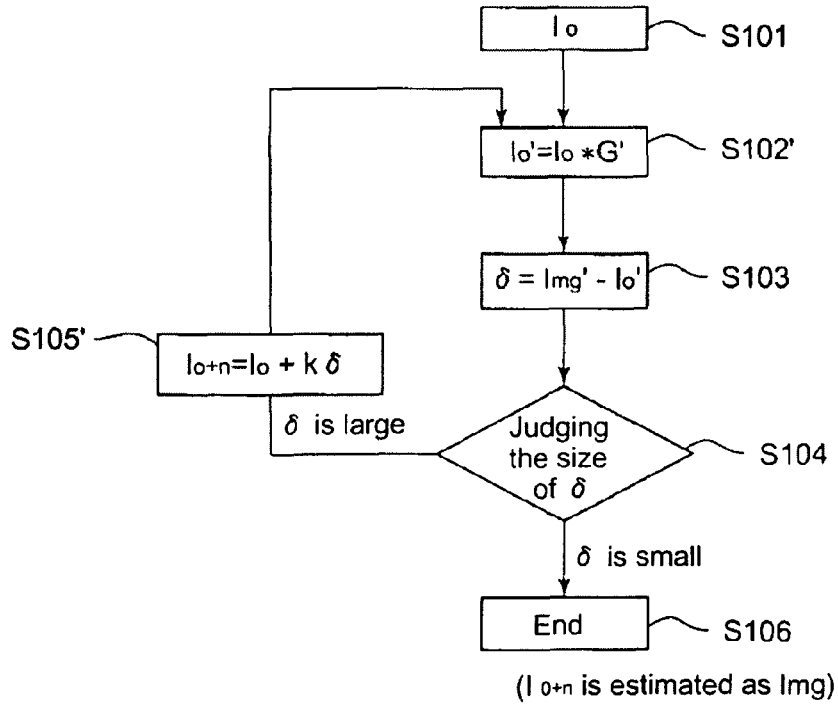
Fig.3

(a)
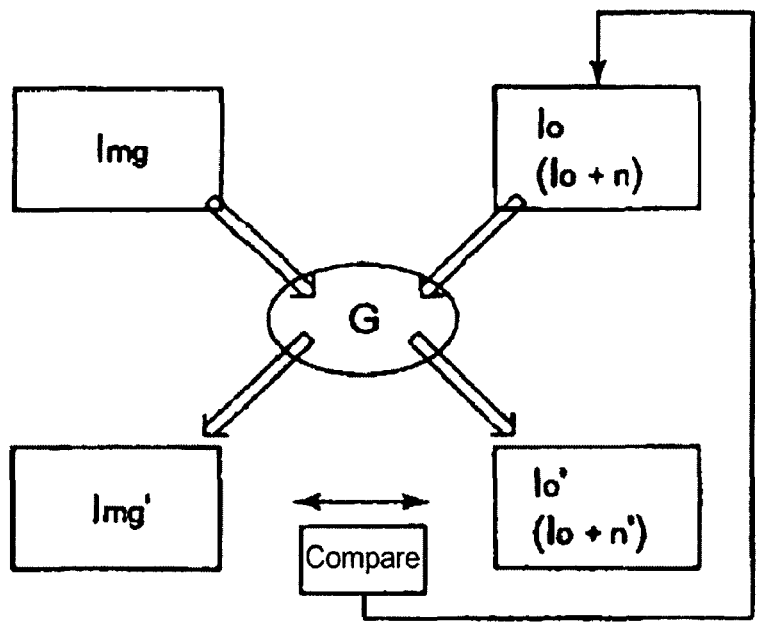
(b)
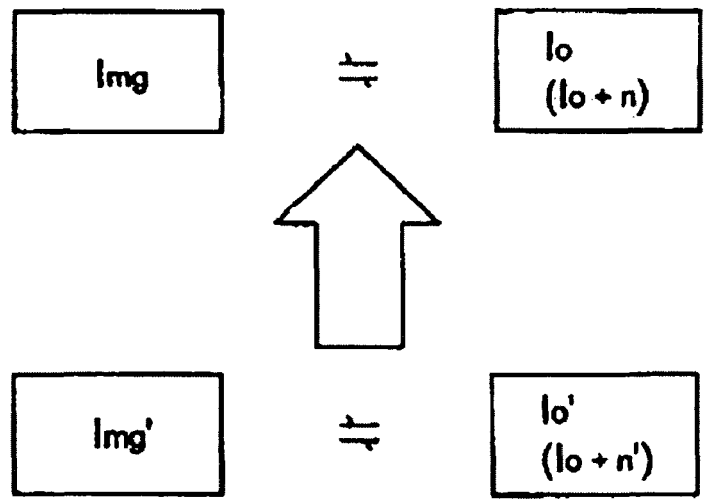
Fig. 4

| Pixels | n-1 | n | n+1 | n+2 | n+3 |
|---|---|---|---|---|---|
| Optical Energy Strength Distribution | 0.0 | 1.0 | 0.0 | 0.0 | 0.0 |

Fig.5

| Pixels | n-3 | n-2 | n-1 | n | n+1 | n+2 | n+3 | n+4 |
|---|---|---|---|---|---|---|---|---|
| Result of Shooting an Image (Original Image Data Img) | 120 | 60 | 80 | 100 | 150 | 80 | 120 | 180 |

Fig.6

| Pixels | n-1 | n | n+1 | n+2 | n+3 |
|---|---|---|---|---|---|
| Optical Energy Strength Distribution | 0.0 | 0.5 | 0.3 | 0.2 | 0.0 |

Fig.7

| Pixels | n-3 | n-2 | n-1 | n | n+1 | n+2 | n+3 | n+4 |
|---|---|---|---|---|---|---|---|---|
| Original Image Data Img | 120 | 60 | 80 | 100 | 150 | 80 | 120 | 180 |
| (n-3)th Blur | 60 | 36 | 24 | 0 | 0 | 0 | 0 | 0 |
| (n-2)th Blur | 0 | 30 | 18 | 12 | 0 | 0 | 0 | 0 |
| (n-1)th Blur | 0 | 0 | 40 | 24 | 16 | 0 | 0 | 0 |
| n th Blur | 0 | 0 | 0 | 50 | 30 | 20 | 0 | 0 |
| (n+1)th Blur | 0 | 0 | 0 | 0 | 75 | 45 | 30 | 0 |
| (n+2)th Blur | 0 | 0 | 0 | 0 | 0 | 40 | 24 | 16 |
| (n+3)th Blur | 0 | 0 | 0 | 0 | 0 | 0 | 60 | 36 |
| (n+4)th Blur | 0 | 0 | 0 | 0 | 0 | 0 | 0 | 90 |
| Object Image Data to be Processed Img' | 60 | 66 | 82 | 86 | 121 | 105 | 114 | 142 |

Fig.8

| Pixels | n-3 | n-2 | n-1 | n | n+1 | n+2 | n+3 | n+4 |
|---|---|---|---|---|---|---|---|---|
| Input Io | 60.00 | 66.00 | 82.00 | 86.00 | 121.00 | 105.00 | 114.00 | 142.00 |
| (n-3)th Blur | 30.00 | 18.00 | 12.00 | 0 | 0 | 0 | 0 | 0 |
| (n-2)th Blur | 0 | 33.00 | 19.80 | 13.20 | 0 | 0 | 0 | 0 |
| (n-1)th Blur | 0 | 0 | 41.00 | 24.60 | 16.40 | 0 | 0 | 0 |
| n th Blur | 0 | 0 | 0 | 43.00 | 25.80 | 17.20 | 0 | 0 |
| (n+1)th Blur | 0 | 0 | 0 | 0 | 60.50 | 36.30 | 24.20 | 0 |
| (n+2)th Blur | 0 | 0 | 0 | 0 | 0 | 52.50 | 31.50 | 21.00 |
| (n+3)th Blur | 0 | 0 | 0 | 0 | 0 | 0 | 57.00 | 34.20 |
| (n+4)th Blur | 0 | 0 | 0 | 0 | 0 | 0 | 0 | 71.00 |
| Output Io' | 30.00 | 51.00 | 72.80 | 80.80 | 102.70 | 106.00 | 112.70 | 126.20 |
| Object Image Data to be Processed Img' | 60.00 | 66.00 | 82.00 | 86.00 | 121.00 | 105.00 | 114.00 | 142.00 |
| Difference δ | 30.00 | 15.00 | 9.20 | 5.20 | 18.30 | -1.00 | -1.30 | 15.80 |

Fig.9

| Pixels | n-3 | n-2 | n-1 | n | n+1 | n+2 | n+3 | n+4 |
|---|---|---|---|---|---|---|---|---|
| Difference δ | 30.00 | 15.00 | 9.20 | 5.20 | 18.30 | -1.00 | -1.30 | 15.80 |
| (n-3)th Allocation | 15.00 | 0 | 0 | 0 | 0 | 0 | 0 | 0 |
| (n-2)th Allocation | 4.50 | 7.50 | 0 | 0 | 0 | 0 | 0 | 0 |
| (n-1)th Allocation | 1.84 | 2.76 | 4.60 | 0 | 0 | 0 | 0 | 0 |
| n th Allocation | 0 | 1.04 | 1.56 | 2.60 | 0 | 0 | 0 | 0 |
| (n+1)th Allocation | 0 | 0 | 3.66 | 5.49 | 9.15 | 0 | 0 | 0 |
| (n+2)th Allocation | 0 | 0 | 0 | -0.20 | -0.30 | -0.50 | 0 | 0 |
| (n+3)th Allocation | 0 | 0 | 0 | 0 | -0.26 | -0.39 | -0.65 | 0 |
| (n+4)th Allocation | 0 | 0 | 0 | 0 | 0 | 3.16 | 4.74 | 7.90 |
| Renewal Amount | 21.34 | 11.30 | 9.82 | 7.89 | 8.59 | 2.27 | 4.09 | 7.90 |
| Input $I_0$ | 60.00 | 66.00 | 82.00 | 86.00 | 121.00 | 105.00 | 114.00 | 142.00 |
| Next Input $I_{0+1}$ | 81.34 | 77.30 | 91.82 | 93.89 | 129.59 | 107.27 | 118.09 | 149.90 |

Fig.10

| Pixels | n-3 | n-2 | n-1 | n | n+1 | n+2 | n+3 | n+4 |
|---|---|---|---|---|---|---|---|---|
| Input I $_{o+1}$ | 81.34 | 77.30 | 91.82 | 93.89 | 129.59 | 107.27 | 118.09 | 149.9 |
| (n-3)th Blur | 40.67 | 24.40 | 16.27 | 0 | 0 | 0 | 0 | 0 |
| (n-2)th Blur | 0 | 38.65 | 23.19 | 15.46 | 0 | 0 | 0 | 0 |
| (n-1)th Blur | 0 | 0 | 45.91 | 27.55 | 18.36 | 0 | 0 | 0 |
| n th Blur | 0 | 0 | 0 | 46.95 | 28.17 | 18.78 | 0 | 0 |
| (n+1)th Blur | 0 | 0 | 0 | 0 | 64.80 | 38.88 | 25.92 | 0 |
| (n+2)th Blur | 0 | 0 | 0 | 0 | 0 | 53.64 | 32.18 | 21.45 |
| (n+3)th Blur | 0 | 0 | 0 | 0 | 0 | 0 | 59.05 | 35.43 |
| (n+4)th Blur | 0 | 0 | 0 | 0 | 0 | 0 | 0 | 74.95 |
| Output I $_{o+1}$' | 40.67 | 63.05 | 85.32 | 89.95 | 111.33 | 111.29 | 117.14 | 131.83 |
| Object Image Data to be Processed Img | 60.00 | 66.00 | 82.00 | 86.00 | 121.00 | 105.00 | 114.00 | 142.00 |
| Difference δ | 19.33 | 2.95 | -3.37 | -3.95 | 9.67 | -6.29 | -3.14 | 10.17 |

Fig.11

| Pixels | n-3 | n-2 | n-1 | n | n+1 | n+2 | n+3 | n+4 |
|---|---|---|---|---|---|---|---|---|
| Difference δ | 19.33 | 2.95 | -3.37 | -3.95 | 9.67 | -6.29 | -3.14 | 10.17 |
| (n-3)th Allocation | 9.67 | 0 | 0 | 0 | 0 | 0 | 0 | 0 |
| (n-2)th Allocation | 0.88 | 1.47 | 0 | 0 | 0 | 0 | 0 | 0 |
| (n-1)th Allocation | -0.67 | -1.01 | -1.68 | 0 | 0 | 0 | 0 | 0 |
| n th Allocation | 0 | -0.79 | -1.19 | -1.98 | 0 | 0 | 0 | 0 |
| (n+1)th Allocation | 0 | 0 | 1.93 | 2.90 | 4.48 | 0 | 0 | 0 |
| (n+2)th Allocation | 0 | 0 | 0 | -1.26 | -1.89 | -3.15 | 0 | 0 |
| (n+3)th Allocation | 0 | 0 | 0 | 0 | -0.63 | -0.94 | -1.57 | 0 |
| (n+4)th Allocation | 0 | 0 | 0 | 0 | 0 | 2.03 | 3.05 | 5.08 |
| Renewal Amount | 9.88 | -0.33 | -0.93 | -0.33 | 2.32 | -2.05 | 1.48 | 5.08 |
| Input Io+1 | 81.34 | 77.30 | 91.82 | 93.89 | 129.59 | 107.27 | 118.09 | 149.90 |
| Next intput Io+2 | 91.22 | 76.97 | 90.89 | 93.56 | 131.91 | 105.22 | 119.57 | 154.98 |

Fig.12

| Pixels | n-1 | n | n+1 | n+2 | n+3 |
|---|---|---|---|---|---|
| Optical Energy Strength Distribution | 0.0 | 0.2 | 0.3 | 0.5 | 0 |

Fig.13

| Pixels | n-3 | n-2 | n-1 | n | n+1 | n+2 | n+3 | n+4 |
|---|---|---|---|---|---|---|---|---|
| Original Image Img | 0.00 | 0.00 | 0.00 | 100.00 | 0.00 | 0.00 | 0.00 | 0.00 |
| Object Image Data to be Processed Img' | 0.00 | 0.00 | 0.00 | 20.00 | 30.00 | 50.00 | 0.00 | 0.00 |

| Pixels | n-3 | n-2 | n-1 | n | n+1 | n+2 | n+3 | n+4 |
|---|---|---|---|---|---|---|---|---|
| Input Io | 0.00 | 0.00 | 0.00 | 0.00 | 0.00 | 0.00 | 0.00 | 0.00 |
| (n-3)th Blur | 0.00 | 0.00 | 0.00 | 0.00 | 0.00 | 0.00 | 0.00 | 0.00 |
| (n-2)th Blur | 0.00 | 0.00 | 0.00 | 0.00 | 0.00 | 0.00 | 0.00 | 0.00 |
| (n-1)th Blur | 0.00 | 0.00 | 0.00 | 0.00 | 0.00 | 0.00 | 0.00 | 0.00 |
| n th Blur | 0.00 | 0.00 | 0.00 | 0.00 | 0.00 | 0.00 | 0.00 | 0.00 |
| (n+1)th Blur | 0.00 | 0.00 | 0.00 | 0.00 | 0.00 | 0.00 | 0.00 | 0.00 |
| (n+2)th Blur | 0.00 | 0.00 | 0.00 | 0.00 | 0.00 | 0.00 | 0.00 | 0.00 |
| (n+3)th Blur | 0.00 | 0.00 | 0.00 | 0.00 | 0.00 | 0.00 | 0.00 | 0.00 |
| (n+4)th Blur | 0.00 | 0.00 | 0.00 | 0.00 | 0.00 | 0.00 | 0.00 | 0.00 |
| Output Io' | 0.00 | 0.00 | 0.00 | 0.00 | 0.00 | 0.00 | 0.00 | 0.00 |
| Object Image Data to be Processed Img' | 0.00 | 0.00 | 0.00 | 20.00 | 30.00 | 50.00 | 0.00 | 0.00 |
| Difference $\delta$ | 0.00 | 0.00 | 0.00 | 20.00 | 30.00 | 50.00 | 0.00 | 0.00 |

(B)

| Pixels | n-3 | n-2 | n-1 | n | n+1 | n+2 | n+3 | n+4 |
|---|---|---|---|---|---|---|---|---|
| Input Io | 0.00 | 0.00 | 0.00 | 0.00 | 0.00 | 0.00 | 0.00 | 0.00 |
| (n-3)th Blur | 0.00 | 0.00 | 0.00 | 0.00 | 0.00 | 0.00 | 0.00 | 0.00 |
| (n-2)th Blur | 0.00 | 0.00 | 0.00 | 0.00 | 0.00 | 0.00 | 0.00 | 0.00 |
| (n-1)th Blur | 0.00 | 0.00 | 0.00 | 0.00 | 0.00 | 0.00 | 0.00 | 0.00 |
| n th Blur | 0.00 | 0.00 | 0.00 | 0.00 | 0.00 | 0.00 | 0.00 | 0.00 |
| (n+1)th Blur | 0.00 | 0.00 | 0.00 | 0.00 | 0.00 | 0.00 | 0.00 | 0.00 |
| (n+2)th Blur | 0.00 | 0.00 | 0.00 | 0.00 | 0.00 | 0.00 | 0.00 | 0.00 |
| (n+3)th Blur | 0.00 | 0.00 | 0.00 | 0.00 | 0.00 | 0.00 | 0.00 | 0.00 |
| (n+4)th Blur | 0.00 | 0.00 | 0.00 | 0.00 | 0.00 | 0.00 | 0.00 | 0.00 |
| Output Io' | 0.00 | 0.00 | 0.00 | 0.00 | 0.00 | 0.00 | 0.00 | 0.00 |
| Object Image Data to be Processed Img' | 0.00 | 0.00 | 0.00 | 20.00 | 30.00 | 50.00 | 0.00 | 0.00 |
| Difference $\delta$ | 0.00 | 0.00 | 0.00 | 20.00 | 30.00 | 50.00 | 0.00 | 0.00 |

| Pixels | n-3 | n-2 | n-1 | n | n+1 | n+2 | n+3 | n+4 |
|---|---|---|---|---|---|---|---|---|
| Difference δ | 0.00 | 0.00 | 0.00 | 20.00 | 30.00 | 50.00 | 0.00 | 0.00 |
| (n-3)th Allocation | 0.00 | 0.00 | 0.00 | 0.00 | 0.00 | 0.00 | 0.00 | 0.00 |
| (n-2)th Allocation | 0.00 | 0.00 | 0.00 | 0.00 | 0.00 | 0.00 | 0.00 | 0.00 |
| (n-1)th Allocation | 0.00 | 0.00 | 0.00 | 0.00 | 0.00 | 0.00 | 0.00 | 0.00 |
| n th Allocation | 0.00 | 10.00 | 6.00 | 4.00 | 0.00 | 0.00 | 0.00 | 0.00 |
| (n+1)th Allocation | 0.00 | 0.00 | 15.00 | 9.00 | 6.00 | 0.00 | 0.00 | 0.00 |
| (n+2)th Allocation | 0.00 | 0.00 | 0.00 | 25.00 | 15.00 | 10.00 | 0.00 | 0.00 |
| (n+3)th Allocation | 0.00 | 0.00 | 0.00 | 0.00 | 0.00 | 0.00 | 0.00 | 0.00 |
| (n+4)th Allocation | 0.00 | 0.00 | 0.00 | 0.00 | 0.00 | 0.00 | 0.00 | 0.00 |
| Renewal Amount | 0.00 | 10.00 | 21.00 | 38.00 | 21.00 | 10.00 | 0.00 | 0.00 |
| Intput Io | 0.00 | 0.00 | 0.00 | 0.00 | 0.00 | 0.00 | 0.00 | 0.00 |
| Next intput Io+1 | 0.00 | 10.00 | 21.00 | 38.00 | 21.00 | 10.00 | 0.00 | 0.00 |

(B)

| Pixels | n-3 | n-2 | n-1 | n | n+1 | n+2 | n+3 | n+4 |
|---|---|---|---|---|---|---|---|---|
| Difference δ | 0.00 | 0.00 | 0.00 | 20.00 | 30.00 | 50.00 | 0.00 | 0.00 |
| (n-3)th Allocation | 0.00 | 0.00 | 0.00 | 0.00 | 0.00 | 0.00 | 0.00 | 0.00 |
| (n-2)th Allocation | 0.00 | 0.00 | 0.00 | 0.00 | 0.00 | 0.00 | 0.00 | 0.00 |
| (n-1)th Allocation | 0.00 | 0.00 | 0.00 | 0.00 | 0.00 | 0.00 | 0.00 | 0.00 |
| n th Allocation | 0.00 | 0.00 | 0.00 | 10.00 | 6.00 | 4.00 | 0.00 | 0.00 |
| (n+1)th Allocation | 0.00 | 0.00 | 0.00 | 0.00 | 15.00 | 9.00 | 6.00 | 0.00 |
| (n+2)th Allocation | 0.00 | 0.00 | 0.00 | 0.00 | 0.00 | 25.00 | 15.00 | 10.00 |
| (n+3)th Allocation | 0.00 | 0.00 | 0.00 | 0.00 | 0.00 | 0.00 | 0.00 | 0.00 |
| (n+4)th Allocation | 0.00 | 0.00 | 0.00 | 0.00 | 0.00 | 0.00 | 0.00 | 0.00 |
| Renewal Amount | 0.00 | 0.00 | 0.00 | 10.00 | 21.00 | 38.00 | 21.00 | 10.00 |
| Intput Io | 0.00 | 0.00 | 0.00 | 0.00 | 0.00 | 0.00 | 0.00 | 0.00 |
| Next intput Io+1 | 0.00 | 0.00 | 0.00 | 10.00 | 21.00 | 38.00 | 21.00 | 10.00 |

| Pixels | n-3 | n-2 | n-1 | n | n+1 | n+2 | n+3 | n+4 |
|---|---|---|---|---|---|---|---|---|
| Input I$_{o+1}$ | 0.00 | 10.00 | 21.00 | 38.00 | 21.00 | 10.00 | 0.00 | 0.00 |
| (n-3)th Blur | 0.00 | 0.00 | 0.00 | 0.00 | 0.00 | 0.00 | 0.00 | 0.00 |
| (n-2)th Blur | 0.00 | 2.00 | 3.00 | 5.00 | 0.00 | 0.00 | 0.00 | 0.00 |
| (n-1)th Blur | 0.00 | 0.00 | 4.20 | 6.30 | 10.50 | 0.00 | 0.00 | 0.00 |
| n th Blur | 0.00 | 0.00 | 0.00 | 7.60 | 11.40 | 19.00 | 0.00 | 0.00 |
| (n+1)th Blur | 0.00 | 0.00 | 0.00 | 0.00 | 4.20 | 6.30 | 10.50 | 0.00 |
| (n+2)th Blur | 0.00 | 0.00 | 0.00 | 0.00 | 0.00 | 2.00 | 3.00 | 5.00 |
| (n+3)th Blur | 0.00 | 0.00 | 0.00 | 0.00 | 0.00 | 0.00 | 0.00 | 0.00 |
| (n+4)th Blur | 0.00 | 0.00 | 0.00 | 0.00 | 0.00 | 0.00 | 0.00 | 0.00 |
| Output I$_{o+1}$' | 0.00 | 2.00 | 7.20 | 18.90 | 26.10 | 27.30 | 13.50 | 5.00 |
| Object Image Data to be Processed Img' | 0.00 | 0.00 | 0.00 | 20.00 | 30.00 | 50.00 | 0.00 | 0.00 |
| Difference δ | 0.00 | -2.00 | -7.20 | 1.10 | 3.90 | 22.70 | -13.50 | -5.00 |

(B)

| Pixels | n-3 | n-2 | n-1 | n | n+1 | n+2 | n+3 | n+4 |
|---|---|---|---|---|---|---|---|---|
| Input I$_{o+1}$ | 0.00 | 0.00 | 0.00 | 10.00 | 21.00 | 38.00 | 21.00 | 10.00 |
| (n-3)th Blur | 0.00 | 0.00 | 0.00 | 0.00 | 0.00 | 0.00 | 0.00 | 0.00 |
| (n-2)th Blur | 0.00 | 0.00 | 0.00 | 0.00 | 0.00 | 0.00 | 0.00 | 0.00 |
| (n-1)th Blur | 0.00 | 0.00 | 0.00 | 0.00 | 0.00 | 0.00 | 0.00 | 0.00 |
| n th Blur | 0.00 | 2.00 | 3.00 | 5.00 | 0.00 | 0.00 | 0.00 | 0.00 |
| (n+1)th Blur | 0.00 | 0.00 | 4.20 | 6.30 | 10.50 | 0.00 | 0.00 | 0.00 |
| (n+2)th Blur | 0.00 | 0.00 | 0.00 | 7.60 | 11.40 | 19.00 | 0.00 | 0.00 |
| (n+3)th Blur | 0.00 | 0.00 | 0.00 | 0.00 | 4.20 | 6.30 | 10.50 | 0.00 |
| (n+4)th Blur | 0.00 | 0.00 | 0.00 | 0.00 | 0.00 | 2.00 | 3.00 | 5.00 |
| Output I$_{o+1}$' | 0.00 | 2.00 | 7.20 | 18.90 | 26.10 | 27.30 | 13.50 | 5.00 |
| Object Image Data to be Processed Img' | 0.00 | 0.00 | 0.00 | 20.00 | 30.00 | 50.00 | 0.00 | 0.00 |
| Difference δ | 0.00 | -2.00 | -7.20 | 1.10 | 3.90 | 22.70 | -13.50 | -5.00 |

| Pixels | n-3 | n-2 | n-1 | n | n+1 | n+2 | n+3 | n+4 |
|---|---|---|---|---|---|---|---|---|
| Difference δ | 0.00 | -2.00 | -7.20 | 1.10 | 3.90 | 22.70 | -13.50 | -5.00 |
| (n-3)th Allocation | 0.00 | 0.00 | 0.00 | 0.00 | 0.00 | 0.00 | 0.00 | 0.00 |
| (n-2)th Allocation | -0.60 | -0.40 | 0.00 | 0.00 | 0.00 | 0.00 | 0.00 | 0.00 |
| (n-1)th Allocation | -3.60 | -2.16 | -1.44 | 0.00 | 0.00 | 0.00 | 0.00 | 0.00 |
| n th Allocation | 0.00 | 0.55 | 0.33 | 0.22 | 0.00 | 0.00 | 0.00 | 0.00 |
| (n+1)th Allocation | 0.00 | 0.00 | 1.95 | 1.17 | 0.78 | 0.00 | 0.00 | 0.00 |
| (n+2)th Allocation | 0.00 | 0.00 | 0.00 | 11.35 | 6.81 | 4.54 | 0.00 | 0.00 |
| (n+3)th Allocation | 0.00 | 0.00 | 0.00 | 0.00 | -6.75 | -4.05 | -2.70 | 0.00 |
| (n+4)th Allocation | 0.00 | 0.00 | 0.00 | 0.00 | 0.00 | -2.50 | -1.50 | -1.00 |
| Renewal Amount | -4.20 | -2.01 | 0.84 | 12.74 | 0.84 | -2.01 | -4.20 | -1.00 |
| Intput $I_{o+1}$ | 0.00 | 10.00 | 21.00 | 38.00 | 21.00 | 10.00 | 0.00 | 0.00 |
| Next intput $I_{o+2}$ | -4.20 | 7.99 | 21.84 | 50.74 | 21.84 | 7.99 | -4.20 | -1.00 |

(B)

| Pixels | n-3 | n-2 | n-1 | n | n+1 | n+2 | n+3 | n+4 |
|---|---|---|---|---|---|---|---|---|
| Difference δ | 0.00 | -2.00 | -7.20 | 1.10 | 3.90 | 22.70 | -13.50 | -5.00 |
| (n-3)th Allocation | 0.00 | 0.00 | 0.00 | 0.00 | 0.00 | 0.00 | 0.00 | 0.00 |
| (n-2)th Allocation | 0.00 | -1.00 | -0.60 | -0.40 | 0.00 | 0.00 | 0.00 | 0.00 |
| (n-1)th Allocation | 0.00 | 0.00 | -3.60 | -2.16 | -1.44 | 0.00 | 0.00 | 0.00 |
| n th Allocation | 0.00 | 0.00 | 0.00 | 0.55 | 0.33 | 0.22 | 0.00 | 0.00 |
| (n+1)th Allocation | 0.00 | 0.00 | 0.00 | 0.00 | 1.95 | 1.17 | 0.78 | 0.00 |
| (n+2)th Allocation | 0.00 | 0.00 | 0.00 | 0.00 | 0.00 | 11.35 | 6.81 | 4.54 |
| (n+3)th Allocation | 0.00 | 0.00 | 0.00 | 0.00 | 0.00 | 0.00 | -6.75 | -4.05 |
| (n+4)th Allocation | 0.00 | 0.00 | 0.00 | 0.00 | 0.00 | 0.00 | 0.00 | -2.50 |
| Renewal Amount | 0.00 | -1.00 | -4.20 | -2.01 | 0.84 | 12.74 | 0.84 | -2.01 |
| Intput $I_{o+1}$ | 0.00 | 0.00 | 0.00 | 10.00 | 21.00 | 38.00 | 21.00 | 10.00 |
| Next intput $I_{o+2}$ | 0.00 | -1.00 | -4.20 | 7.99 | 21.84 | 50.74 | 21.84 | 7.99 |

| Pixels | n-3 | n-2 | n-1 | n | n+1 | n+2 | n+3 | n+4 |
|---|---|---|---|---|---|---|---|---|
| Input I $_{o+2}$ | -4.20 | 7.99 | 21.84 | 50.74 | 21.84 | 7.99 | -4.20 | -1.00 |
| (n-3)th Blur | -0.84 | -1.25 | -2.10 | 0.00 | 0.00 | 0.00 | 0.00 | 0.00 |
| (n-2)th Blur | 0.00 | 1.60 | 2.40 | 4.00 | 0.00 | 0.00 | 0.00 | 0.00 |
| (n-1)th Blur | 0.00 | 0.00 | 4.37 | 6.55 | 10.92 | 0.00 | 0.00 | 0.00 |
| n th Blur | 0.00 | 0.00 | 0.00 | 10.15 | 15.22 | 25.37 | 0.00 | 0.00 |
| (n+1)th Blur | 0.00 | 0.00 | 0.00 | 0.00 | 4.37 | 6.55 | 10.92 | 0.00 |
| (n+2)th Blur | 0.00 | 0.00 | 0.00 | 0.00 | 0.00 | 1.60 | 2.40 | 4.00 |
| (n+3)th Blur | 0.00 | 0.00 | 0.00 | 0.00 | 0.00 | 0.00 | -0.84 | -1.26 |
| (n+4)th Blur | 0.00 | 0.00 | 0.00 | 0.00 | 0.00 | 0.00 | 0.00 | -0.20 |
| Output I $_{o+2}$' | -0.84 | 0.34 | 4.67 | 20.70 | 30.51 | 33.52 | 12.48 | 2.54 |
| Object Image Data to be Processed Img' | 0.00 | 0.00 | 0.00 | 20.00 | 30.00 | 50.00 | 0.00 | 0.00 |
| Difference $\delta$ | 0.84 | -0.34 | -4.67 | -0.70 | -0.51 | 16.48 | -12.48 | -2.54 |

(B)

| Pixels | n-3 | n-2 | n-1 | n | n+1 | n+2 | n+3 | n+4 |
|---|---|---|---|---|---|---|---|---|
| Input I $_{o+2}$ | 0.00 | -1.00 | -4.20 | 7.99 | 21.84 | 50.74 | 21.84 | 7.99 |
| (n-3)th Blur | 0.00 | 0.00 | 0.00 | 0.00 | 0.00 | 0.00 | 0.00 | 0.00 |
| (n-2)th Blur | -0.30 | -0.50 | 0.00 | 0.00 | 0.00 | 0.00 | 0.00 | 0.00 |
| (n-1)th Blur | -0.84 | -1.26 | -2.10 | 0.00 | 0.00 | 0.00 | 0.00 | 0.00 |
| n th Blur | 0.00 | 1.60 | 2.40 | 4.00 | 0.00 | 0.00 | 0.00 | 0.00 |
| (n+1)th Blur | 0.00 | 0.00 | 4.37 | 6.55 | 10.92 | 0.00 | 0.00 | 0.00 |
| (n+2)th Blur | 0.00 | 0.00 | 0.00 | 10.15 | 15.22 | 25.37 | 0.00 | 0.00 |
| (n+3)th Blur | 0.00 | 0.00 | 0.00 | 0.00 | 4.37 | 6.55 | 10.92 | 0.00 |
| (n+4)th Blur | 0.00 | 0.00 | 0.00 | 0.00 | 0.00 | 1.60 | 2.40 | 4.00 |
| Output I $_{o+2}$' | -1.14 | -0.16 | 4.67 | 20.70 | 30.51 | 33.52 | 13.32 | 4.00 |
| Object Image Data to be Processed Img' | 0.00 | 0.00 | 0.00 | 20.00 | 30.00 | 50.00 | 0.00 | 0.00 |
| Difference $\delta$ | 1.14 | 0.16 | -4.67 | -0.70 | -0.51 | 16.48 | -13.32 | -4.00 |

| Pixels | n-3 | n-2 | n-1 | n | n+1 | n+2 | n+3 | n+4 |
|---|---|---|---|---|---|---|---|---|
| Difference $\delta$ | 0.84 | -0.34 | -4.67 | -0.70 | -0.51 | 16.48 | -12.48 | -2.54 |
| (n-3)th Allocation | 0.17 | 0.00 | 0.00 | 0.00 | 0.00 | 0.00 | 0.00 | 0.00 |
| (n-2)th Allocation | -0.10 | -0.07 | 0.00 | 0.00 | 0.00 | 0.00 | 0.00 | 0.00 |
| (n-1)th Allocation | -2.33 | -1.40 | -0.93 | 0.00 | 0.00 | 0.00 | 0.00 | 0.00 |
| n th Allocation | 0.00 | -0.35 | -0.21 | -0.14 | 0.00 | 0.00 | 0.00 | 0.00 |
| (n+1)th Allocation | 0.00 | 0.00 | -0.25 | -0.15 | -0.10 | 0.00 | 0.00 | 0.00 |
| (n+2)th Allocation | 0.00 | 0.00 | 0.00 | 8.24 | 4.94 | 3.30 | 0.00 | 0.00 |
| (n+3)th Allocation | 0.00 | 0.00 | 0.00 | 0.00 | -6.24 | -3.74 | -2.50 | 0.00 |
| (n+4)th Allocation | 0.00 | 0.00 | 0.00 | 0.00 | 0.00 | -1.27 | -0.76 | -0.51 |
| Renewal Amount | -2.27 | -1.81 | -1.40 | 7.95 | -1.40 | -1.71 | -3.26 | -0.51 |
| Input I o+2 | -4.20 | 7.99 | 21.84 | 50.74 | 21.84 | 7.99 | -4.20 | -1.00 |
| Next Input I o+3 | -6.47 | 6.18 | 20.44 | 58.69 | 20.44 | 6.28 | -7.46 | -1.51 |

(B)

| Pixels | n-3 | n-2 | n-1 | n | n+1 | n+2 | n+3 | n+4 |
|---|---|---|---|---|---|---|---|---|
| Difference $\delta$ | 1.14 | 0.16 | -4.67 | -0.70 | -0.51 | 16.48 | -13.32 | -4.00 |
| (n-3)th Allocation | 0.57 | 0.34 | 0.23 | 0.00 | 0.00 | 0.00 | 0.00 | 0.00 |
| (n-2)th Allocation | 0.00 | 0.08 | 0.05 | 0.03 | 0.00 | 0.00 | 0.00 | 0.00 |
| (n-1)th Allocation | 0.00 | 0.00 | -2.33 | -1.40 | -0.93 | 0.00 | 0.00 | 0.00 |
| n th Allocation | 0.00 | 0.00 | 0.00 | -0.35 | -0.21 | -0.14 | 0.00 | 0.00 |
| (n+1)th Allocation | 0.00 | 0.00 | 0.00 | 0.00 | -0.25 | -0.15 | -0.10 | 0.00 |
| (n+2)th Allocation | 0.00 | 0.00 | 0.00 | 0.00 | 0.00 | 8.24 | 4.94 | 3.30 |
| (n+3)th Allocation | 0.00 | 0.00 | 0.00 | 0.00 | 0.00 | 0.00 | -6.66 | -4.00 |
| (n+4)th Allocation | 0.00 | 0.00 | 0.00 | 0.00 | 0.00 | 0.00 | 0.00 | -2.00 |
| Renewal Amount | 0.57 | 0.42 | -2.06 | -1.71 | -1.40 | 7.95 | -1.82 | -2.70 |
| Input I o+2 | 0.00 | -1.00 | -4.20 | 7.99 | 21.84 | 50.74 | 21.84 | 7.99 |
| Next Input I o+3 | 0.57 | -0.58 | -6.26 | 6.28 | 20.44 | 58.69 | 20.02 | 5.29 |

| Pixels | n-3 | n-2 | n-1 | n | n+1 | n+2 | n+3 | n+4 |
|---|---|---|---|---|---|---|---|---|
| Input I $_{0+3}$ | -6.47 | 6.18 | 20.44 | 58.69 | 20.44 | 6.28 | -7.46 | -1.51 |
| (n-3)th Blur | -1.29 | -1.94 | -3.23 | 0.00 | 0.00 | 0.00 | 0.00 | 0.00 |
| (n-2)th Blur | 0.00 | 1.24 | 1.85 | 3.09 | 0.00 | 0.00 | 0.00 | 0.00 |
| (n-1)th Blur | 0.00 | 0.00 | 4.09 | 6.13 | 10.22 | 0.00 | 0.00 | 0.00 |
| n th Blur | 0.00 | 0.00 | 0.00 | 11.74 | 17.61 | 29.34 | 0.00 | 0.00 |
| (n+1)th Blur | 0.00 | 0.00 | 0.00 | 0.00 | 4.09 | 6.13 | 10.22 | 0.00 |
| (n+2)th Blur | 0.00 | 0.00 | 0.00 | 0.00 | 0.00 | 1.26 | 1.88 | 3.14 |
| (n+3)th Blur | 0.00 | 0.00 | 0.00 | 0.00 | 0.00 | 0.00 | -1.49 | -2.24 |
| (n+4)th Blur | 0.00 | 0.00 | 0.00 | 0.00 | 0.00 | 0.00 | 0.00 | -0.30 |
| Output I $_{0+3}$' | -1.29 | -0.70 | 2.71 | 20.96 | 31.92 | 36.73 | 10.61 | 0.60 |
| Object Image Data to be Processed Img' | 0.00 | 0.00 | 0.00 | 20.00 | 30.00 | 50.00 | 0.00 | 0.00 |
| Difference $\delta$ | 1.29 | 0.70 | -2.71 | -0.96 | -1.92 | 13.27 | -10.61 | -0.60 |

(B)

| Pixels | n-3 | n-2 | n-1 | n | n+1 | n+2 | n+3 | n+4 |
|---|---|---|---|---|---|---|---|---|
| Input I $_{0+3}$ | 0.57 | -0.58 | -6.26 | 6.28 | 20.44 | 58.69 | 20.02 | 5.29 |
| (n-3)th Blur | 0.29 | 0.00 | 0.00 | 0.00 | 0.00 | 0.00 | 0.00 | 0.00 |
| (n-2)th Blur | -0.17 | -0.29 | 0.00 | 0.00 | 0.00 | 0.00 | 0.00 | 0.00 |
| (n-1)th Blur | -1.25 | -1.88 | -3.13 | 0.00 | 0.00 | 0.00 | 0.00 | 0.00 |
| n th Blur | 0.00 | 1.26 | 1.88 | 3.14 | 0.00 | 0.00 | 0.00 | 0.00 |
| (n+1)th Blur | 0.00 | 0.00 | 4.09 | 6.13 | 10.22 | 0.00 | 0.00 | 0.00 |
| (n+2)th Blur | 0.00 | 0.00 | 0.00 | 11.74 | 17.61 | 29.34 | 0.00 | 0.00 |
| (n+3)th Blur | 0.00 | 0.00 | 0.00 | 0.00 | 4.00 | 6.01 | 10.01 | 0.00 |
| (n+4)th Blur | 0.00 | 0.00 | 0.00 | 0.00 | 0.00 | 1.06 | 1.59 | 2.65 |
| Output I $_{0+3}$' | -1.14 | -0.91 | 2.84 | 21.01 | 31.83 | 36.41 | 11.60 | 2.65 |
| Object Image Data to be Processed Img' | 0.00 | 0.00 | 0.00 | 20.00 | 30.00 | 50.00 | 0.00 | 0.00 |
| Difference $\delta$ | 1.14 | 0.91 | -2.84 | -1.01 | -1.83 | 13.59 | -11.60 | -2.65 |

| Pixels | n-3 | n-2 | n-1 | n | n+1 | n+2 | n+3 | n+4 |
|---|---|---|---|---|---|---|---|---|
| Difference δ | 1.29 | 0.70 | -2.71 | -0.96 | -1.92 | 13.27 | -10.61 | -0.50 |
| (n-3)th Allocation | 0.26 | 0.00 | 0.00 | 0.00 | 0.00 | 0.00 | 0.00 | 0.00 |
| (n-2)th Allocation | 0.21 | 0.14 | 0.00 | 0.00 | 0.00 | 0.00 | 0.00 | 0.00 |
| (n-1)th Allocation | -1.35 | -0.81 | -0.54 | 0.00 | 0.00 | 0.00 | 0.00 | 0.00 |
| n th Allocation | 0.00 | -0.48 | -0.29 | -0.19 | 0.00 | 0.00 | 0.00 | 0.00 |
| (n+1)th Allocation | 0.00 | 0.00 | -0.96 | -0.58 | -0.38 | 0.00 | 0.00 | 0.00 |
| (n+2)th Allocation | 0.00 | 0.00 | 0.00 | 6.63 | 3.98 | 2.65 | 0.00 | 0.00 |
| (n+3)th Allocation | 0.00 | 0.00 | 0.00 | 0.00 | -5.31 | -3.18 | -2.12 | 0.00 |
| (n+4)th Allocation | 0.00 | 0.00 | 0.00 | 0.00 | 0.00 | -0.30 | -0.18 | -0.12 |
| Renewal Amount | -0.88 | -1.15 | -1.79 | 5.87 | -1.71 | -0.83 | -2.30 | -0.12 |
| Input I $_{o+3}$ | -6.47 | 6.18 | 20.44 | 58.69 | 20.44 | 6.28 | -7.46 | -1.51 |
| Next Input I $_{o+4}$ | -7.35 | 5.02 | 18.66 | 64.56 | 18.73 | 5.45 | -9.76 | -1.63 |

(B)

| Pixels | n-3 | n-2 | n-1 | n | n+1 | n+2 | n+3 | n+4 |
|---|---|---|---|---|---|---|---|---|
| Difference δ | 1.14 | 0.91 | -2.84 | -1.01 | -1.83 | 13.59 | -11.60 | -2.65 |
| (n-3)th Allocation | 0.57 | 0.34 | 0.23 | 0.00 | 0.00 | 0.00 | 0.00 | 0.00 |
| (n-2)th Allocation | 0.00 | 0.46 | 0.27 | 0.18 | 0.00 | 0.00 | 0.00 | 0.00 |
| (n-1)th Allocation | 0.00 | 0.00 | -1.42 | -0.85 | -0.57 | 0.00 | 0.00 | 0.00 |
| n th Allocation | 0.00 | 0.00 | 0.00 | -0.50 | -0.30 | -0.20 | 0.00 | 0.00 |
| (n+1)th Allocation | 0.00 | 0.00 | 0.00 | 0.00 | -0.92 | -0.55 | -0.37 | 0.00 |
| (n+2)th Allocation | 0.00 | 0.00 | 0.00 | 0.00 | 0.00 | 6.80 | 4.08 | 2.72 |
| (n+3)th Allocation | 0.00 | 0.00 | 0.00 | 0.00 | 0.00 | 0.00 | -5.80 | -3.48 |
| (n+4)th Allocation | 0.00 | 0.00 | 0.00 | 0.00 | 0.00 | 0.00 | 0.00 | -1.32 |
| Renewal Amount | 0.57 | 0.80 | -0.92 | -1.18 | -1.79 | 6.04 | -2.09 | -2.09 |
| Input I $_{o+3}$ | 0.57 | -0.58 | -6.26 | 6.28 | 20.44 | 58.69 | 20.02 | 5.29 |
| Next Input I $_{o+4}$ | 1.14 | 0.22 | -7.18 | 5.10 | 18.66 | 64.73 | 17.93 | 3.21 |

| Pixels | n-3 | n-2 | n-1 | n | n+1 | n+2 | n+3 | n+4 |
|---|---|---|---|---|---|---|---|---|
| Input I $_{0+4}$ | -7.35 | 5.02 | 18.66 | 64.56 | 18.73 | 5.45 | -9.76 | -1.63 |
| (n-3)th Blur | -1.47 | -2.21 | -3.68 | 0.00 | 0.00 | 0.00 | 0.00 | 0.00 |
| (n-2)th Blur | 0.00 | 1.00 | 1.51 | 2.51 | 0.00 | 0.00 | 0.00 | 0.00 |
| (n-1)th Blur | 0.00 | 0.00 | 3.73 | 5.60 | 9.33 | 0.00 | 0.00 | 0.00 |
| n th Blur | 0.00 | 0.00 | 0.00 | 12.91 | 19.37 | 32.28 | 0.00 | 0.00 |
| (n+1)th Blur | 0.00 | 0.00 | 0.00 | 0.00 | 3.75 | 5.62 | 9.37 | 0.00 |
| (n+2)th Blur | 0.00 | 0.00 | 0.00 | 0.00 | 0.00 | 1.09 | 1.63 | 2.72 |
| (n+3)th Blur | 0.00 | 0.00 | 0.00 | 0.00 | 0.00 | 0.00 | -1.95 | -2.93 |
| (n+4)th Blur | 0.00 | 0.00 | 0.00 | 0.00 | 0.00 | 0.00 | 0.00 | -0.33 |
| Output I $_{0+4}$' | -1.47 | -1.20 | 1.56 | 21.02 | 32.44 | 38.99 | 9.05 | -0.53 |
| Object Image Data to be Processed Img' | 0.00 | 0.00 | 0.00 | 20.00 | 30.00 | 50.00 | 0.00 | 0.00 |
| Difference δ | 1.47 | 1.20 | -1.56 | -1.02 | -2.44 | 11.01 | -9.05 | 0.53 |

(B)

| Pixels | n-3 | n-2 | n-1 | n | n+1 | n+2 | n+3 | n+4 |
|---|---|---|---|---|---|---|---|---|
| Input I $_{0+4}$ | 1.14 | 0.22 | -7.18 | 5.10 | 18.66 | 64.73 | 17.93 | 3.21 |
| (n-3)th Blur | 0.57 | 0.00 | 0.00 | 0.00 | 0.00 | 0.00 | 0.00 | 0.00 |
| (n-2)th Blur | 0.07 | 0.11 | 0.00 | 0.00 | 0.00 | 0.00 | 0.00 | 0.00 |
| (n-1)th Blur | -1.44 | -2.15 | -3.59 | 0.00 | 0.00 | 0.00 | 0.00 | 0.00 |
| n th Blur | 0.00 | 1.02 | 1.53 | 2.55 | 0.00 | 0.00 | 0.00 | 0.00 |
| (n+1)th Blur | 0.00 | 0.00 | 3.73 | 5.60 | 9.33 | 0.00 | 0.00 | 0.00 |
| (n+2)th Blur | 0.00 | 0.00 | 0.00 | 12.95 | 19.42 | 32.37 | 0.00 | 0.00 |
| (n+3)th Blur | 0.00 | 0.00 | 0.00 | 0.00 | 3.59 | 5.38 | 8.97 | 0.00 |
| (n+4)th Blur | 0.00 | 0.00 | 0.00 | 0.00 | 0.00 | 0.64 | 0.96 | 1.60 |
| Output I $_{0+4}$' | -0.80 | -1.02 | 1.67 | 21.09 | 32.33 | 38.38 | 9.93 | 1.60 |
| Object Image Data to be Processed Img' | 0.00 | 0.00 | 0.00 | 20.00 | 30.00 | 50.00 | 0.00 | 0.00 |
| Difference δ | 0.80 | 1.02 | -1.67 | -1.09 | -2.33 | 11.61 | -9.93 | -1.60 |

| Pixels | n-3 | n-2 | n-1 | n | n+1 | n+2 | n+3 | n+4 |
|---|---|---|---|---|---|---|---|---|
| Difference δ | 1.47 | 1.20 | -1.56 | -1.02 | -2.44 | 11.01 | -9.05 | 0.53 |
| (n-3)th Allocation | 0.29 | 0.00 | 0.00 | 0.00 | 0.00 | 0.00 | 0.00 | 0.00 |
| (n-2)th Allocation | 0.36 | 0.24 | 0.00 | 0.00 | 0.00 | 0.00 | 0.00 | 0.00 |
| (n-1)th Allocation | -0.78 | -0.47 | -0.31 | 0.00 | 0.00 | 0.00 | 0.00 | 0.00 |
| n th Allocation | 0.00 | -0.51 | -0.31 | -0.20 | 0.00 | 0.00 | 0.00 | 0.00 |
| (n+1)th Allocation | 0.00 | 0.00 | -1.22 | -0.73 | -0.49 | 0.00 | 0.00 | 0.00 |
| (n+2)th Allocation | 0.00 | 0.00 | 0.00 | 5.51 | 3.30 | 2.20 | 0.00 | 0.00 |
| (n+3)th Allocation | 0.00 | 0.00 | 0.00 | 0.00 | -4.52 | -2.71 | -1.81 | 0.00 |
| (n+4)th Allocation | 0.00 | 0.00 | 0.00 | 0.00 | 0.00 | 0.27 | 0.16 | 0.11 |
| Renewal Amount | -0.13 | -0.74 | -1.84 | 4.57 | -1.71 | -0.25 | -1.65 | 0.11 |
| Input I o+4 | -7.35 | 5.02 | 18.66 | 64.56 | 18.73 | 5.45 | -9.76 | -1.63 |
| Next Input I o+5 | -7.48 | 4.29 | 16.82 | 69.13 | 17.03 | 5.20 | -11.41 | -1.52 |

(B)

| Pixels | n-3 | n-2 | n-1 | n | n+1 | n+2 | n+3 | n+4 |
|---|---|---|---|---|---|---|---|---|
| Difference δ | 0.80 | 1.02 | -1.67 | -1.09 | -2.33 | 11.61 | -9.93 | -1.60 |
| (n-3)th Allocation | 0.40 | 0.24 | 0.16 | 0.00 | 0.00 | 0.00 | 0.00 | 0.00 |
| (n-2)th Allocation | 0.00 | 0.51 | 0.31 | 0.20 | 0.00 | 0.00 | 0.00 | 0.00 |
| (n-1)th Allocation | 0.00 | 0.00 | -0.84 | -0.50 | -0.33 | 0.00 | 0.00 | 0.00 |
| n th Allocation | 0.00 | 0.00 | 0.00 | -0.55 | -0.33 | -0.22 | 0.00 | 0.00 |
| (n+1)th Allocation | 0.00 | 0.00 | 0.00 | 0.00 | -1.17 | -0.70 | -0.47 | 0.00 |
| (n+2)th Allocation | 0.00 | 0.00 | 0.00 | 0.00 | 0.00 | 5.81 | 3.48 | 2.32 |
| (n+3)th Allocation | 0.00 | 0.00 | 0.00 | 0.00 | 0.00 | 0.00 | -4.96 | -2.98 |
| (n+4)th Allocation | 0.00 | 0.00 | 0.00 | 0.00 | 0.00 | 0.00 | 0.00 | -0.80 |
| Renewal Amount | 0.40 | 0.75 | -0.37 | -0.84 | -1.83 | 4.89 | -1.95 | -1.46 |
| Input I o+4 | 1.14 | 0.22 | -7.18 | 5.10 | 18.66 | 64.73 | 17.93 | 3.21 |
| Next Input I o+5 | 1.54 | 0.97 | -7.55 | 4.26 | 16.83 | 69.62 | 15.99 | 1.75 |

| Pixels | n-3 | n-2 | n-1 | n | n+1 | n+2 | n+3 | n+4 |
|---|---|---|---|---|---|---|---|---|
| Next Input I o+n | 0.00 | 0.00 | 0.00 | 100.00 | 0.00 | 0.00 | 0.00 | 0.00 |

(B)

| Pixels | n-3 | n-2 | n-1 | n | n+1 | n+2 | n+3 | n+4 |
|---|---|---|---|---|---|---|---|---|
| Next Input I o+n | 0.00 | 0.00 | 0.00 | 0.00 | 0.00 | 100.00 | 0.00 | 0.00 |

Fig.25

IMAGE PROCESSING DEVICE

FIELD OF THE INVENTION

The present invention relates to an image processing device.

BACKGROUND OF THE INVENTION

It is conventionally known that a shot image is deteriorated or blurred when taking a picture with a camera including an imaging element such as charged coupled device (CCD) mainly due to hand jiggling when taking a picture, various aberrations in optics, lens distortion in optics and the like.

In order to stabilizing the deteriorated shot image, two methods, moving lens and electronic processing are known regarding hand jiggling at the time of shooting an image among deterioration factors of a shot image. As the method of moving lens, the patent document 1 discloses a method where the movement of an imaging position on an imaging element is restricted by detecting hand jiggling with a camera and moving a predetermined lens in optics along with the movement of a camera due to detected hand jiggling.

As a method of electronic processing, the document 2 discloses a method of restoring a clear image by detecting displacement of a camera's optical axis with an angular velocity sensor, gaining a transfer function showing a blurry state at the time shooting an image from detected angular velocity, and transforming inversely the gained transfer function about a shot image.

[Patent Document 1] Unexamined patent publication 6-317824 (see the summary)

[Patent Document 2] Unexamined patent publication 11-24122 (see the summary)

A camera, equipped with a method of stabilizing an image shown in the patent document 1, becomes a large size because of necessity of a space for mounting hardware for driving a lens such as motor and the like. Further, installing such hardware and a driving circuit for driving the hardware needs to increase a cost.

On the other hand, a method of stabilizing an image shown in the patent document 2 includes following issues, although the method does not have the above mentioned problem.

When looking at a display in which a deteriorated shot image due to hand jiggling is displayed, a person can recognize that a shot image is blurred along a track of a camera's movement due to hand jiggling from time of starting exposure as starting shooting an image till time of ending such exposure as ending shooting an image. When the deteriorated shot image is restored on a display based on a transfer function, the restored image seems to be produced so that the blurred shot image is focused on the position at the time of starting exposure.

However, it may be happened that an image is shot while a hand jiggling speed becomes slow on the way of hand jiggling or at the end of completing exposure depending on a way of hand jiggling. The shot image under such situation is an image having longer exposure time on the way of hand jiggling or at the end of completing exposure. In the shot image, the brightness is relatively high on the way of hand jiggling and at the end portion because of the above situation. Further, when such shot image is restored, the image gives a person unnatural feeling since such highly bright area on the way of hand jiggling and end portion seem to be moved to the position of starting shooting an image.

OBJECT AND SUMMARY OF THE INVENTION

In order to solve such problem, the present invention is to provide an image processing device that produces a restored image which give a person natural feeling when a shot image with longer exposure time on the way to image blurring due to hand jiggling or an end portion is restored.

According to an aspect of the invention, an image processing device comprises: an image processing unit that produces a restored image approximated to an original image from an object image to be processed, which is fluctuated against the original image due to movement of an image shooting device during exposure. The image processing unit produces the restored image while making the restored image correspond to a position having the longest exposure time for an object image to be processed.

According to this aspect, the restored image is produced at a position having the longest exposure time for the object image to be processed. The restored image gives a person natural feeling since there is no misalignment on display between the object image to be processed and the restored image.

In addition to the aspect, a position having the longest exposure time may be placed at a pixel having the data value which is the largest fluctuation-factor information data as a factor of image fluctuation.

In this aspect, a position having the longest exposure time is judged based on the fluctuation-factor information data as a factor of an image fluctuation, easily obtaining information regarding the longest exposure time.

In addition to the aspect of the invention, the image processing device may repeat the following processes to produce a restored image approximated to the original image before fluctuating: The image processing unit may produce a comparison image data from an arbitrary image data by using a fluctuation-factor information data; compare the comparison image data with an object image data to be processed thereafter; produces restored data by allocating differential data to the arbitrary image data through using the fluctuation-factor information data, the differential data being the difference between the comparison image data and the object image data to be processed; and substitute the restored data for the arbitrary image data thereafter.

In this aspect of the invention, the processing unit repeats process in which the comparison image data is produced using the fluctuation factor information and the comparison image data is compared with the object image data to be processed. Then, it gradually obtains a restored image data approximated to the original image before fluctuation as a base for an object image to be processed. Hence, information regarding the position having the longest exposure time can be obtained based on the fluctuation-factor information data as a factor of image fluctuation. Further, producing the restored image data can be a practical operation.

The present invention is able to produce a restored image which gives a person natural feeling when a shot image with longer exposure time on the way to image blurring due to hand jiggling or an end portion is restored.

BRIEF DESCRIPTION OF THE DRAWINGS

FIG. 2 is a perspective and schematic view showing an overall concept of the image processing device shown in FIG. 1 and the location of an angular speed sensor.

FIGS. 3 (A) and (B) are diagrams showing a method processed by a processing unit in the image processing device in FIG. 1. FIG. 3 (A) is a flow chart explaining a basic concept of a processing method. FIG. 3 (B) is a flow chart explaining a method processed by the processing unit in the image processing device in FIG. 1.

FIG. 4 is a diagram explaining a concept of the processing method shown in FIG. 3 (A).

FIG. 5 is a chart concretely explaining the processing method shown in FIG. 3 (A) as an example of hand jiggling and a table showing energy concentration without hand jiggling.

FIG. 6 is a chart briefly explaining the processing method shown in FIG. 3 (A) as an example of hand jiggling and a table showing an original image data without hand jiggling.

FIG. 7 is a chart concretely explaining the processing method shown in FIG. 3 (A) as an example of hand jiggling and a table showing optical energy dispersion when hand jiggling.

FIG. 8 is a chart briefly explaining the processing method shown in FIG. 3 (A) as an example of hand jiggling and a diagram showing production of comparison image data from an arbitrary image.

FIG. 9 is a chart briefly explaining the processing method shown in FIG. 3 (A) as an example of hand jiggling and a diagram showing production of differential data by comparing the comparison image data with the object image to be processed.

FIG. 10 is a chart briefly explaining the processing method shown in FIG. 3 (A) as an example of hand jiggling and a diagram showing production of restored image data by allocating the differential data and adding it to the arbitrary image.

FIG. 11 is a chart briefly explaining the processing method shown in FIG. 3 (A) as an example of hand jiggling and a diagram showing generation of a new comparison image data from a restored data and a differential data by comparing the comparison image data with an object image to be processed.

FIG. 12 is a chart briefly explaining the processing method shown in FIG. 3 (A) as an example of hand jiggling and a diagram showing production of a new restored image data by allocating the differential data.

FIG. 13 is a chart showing a state of hand jiggling in order to explain a method processed by the processing unit in the image processing device shown in FIG. 1 and a table showing energy dispersion when hand jiggling is occurred so as to delay end of hand jiggling instead of start of it.

FIG. 14 is a table showing a optical energy states of a pixels in a image object to be processed Img' when a pixel n of which optical energy is 100 is blurred by the fluctuation-factor information data G due to the dispersion of optical energy shown in FIG. 13.

FIG. 15 (A) is a table showing a situation where the differential data is produced by comparing the comparison image data with the object image data to be processed based on a first processing flow in the method shown in the process flow (A) of FIG. 3. FIG. 15 (B) is a table showing a situation where the differential data is produced by comparing the comparison image data with the object image data to be processed based on a first processing flow in the method shown in the process flow (B) of FIG. 3.

FIG. 16 (A) is a table showing a situation where the newly restored image data is produced by allocating the newly produced differential data based on the first processing flow in the method shown in the process flow (A) of FIG. 3. FIG. 16 (B) is a table showing a situation where the new restored image data is produced by allocating the newly produced differential data based on a first processing flow in the method shown in the process flow (B) of FIG. 3.

FIG. 17 (A) is a table showing a situation where the differential data is produced by comparing the comparison image data with the object image data to be processed based on a second processing flow in the method shown in the process flow (A) of FIG. 3. FIG. 17 (B) is a table showing a situation where the differential data is produced by comparing the comparison image data with the object image data to be processed based on the second processing flow in the method shown in the process flow (B) of FIG. 3.

FIG. 18 (A) is a table showing a situation where the newly restored image data is produced by allocating the newly produced differential data based on the second processing flow in the method shown in the process flow (A) of FIG. 3. FIG. 18 (B) is a table showing a situation where the newly restored image data is produced by allocating the newly produced differential data based on the second processing flow in the method shown in the process flow (B) of FIG. 3.

FIG. 19 (A) is a table showing a situation where the differential data is produced by comparing the comparison image data with the object image data to be processed based on a third processing flow in the method shown in the process flow (A) of FIG. 3. FIG. 19 (B) is a table showing a situation where the differential data is produced by comparing the comparison image data with the object image data to be processed based on the third processing flow in the method shown in the process flow (B) of FIG. 3.

FIG. 20 (A) is a table showing a situation where the newly restored image data is produced by allocating the newly produced differential data based on the third processing flow in the method shown in the process flow (A) of FIG. 3. FIG. 20 (B) is a table showing a situation where the newly restored image data is produced by allocating the newly produced differential data based on the third processing flow in the method shown in the process flow (B) of FIG. 3.

FIG. 21 (A) is a table showing a situation where the differential data is produced by comparing the comparison image data with the object image data to be processed based on a fourth processing flow in the method shown in the process flow (A) of FIG. 3. FIG. 21 (B) is a table showing a situation where the differential data is produced by comparing the comparison data with the object image data to be processed based on the fourth processing flow in the method shown in the process flow (B) of FIG. 3.

FIG. 22 (A) is a table showing a situation where the newly restored image data is produced by allocating the newly produced differential data based on the fourth processing flow in the method shown in the process flow (A) of FIG. 3. FIG. 22 (B) is a table showing a situation where the newly restored image data is produced by allocating the newly produced differential data based on the fourth processing flow in the method shown in the process flow (B) of FIG. 3.

FIG. 23 (A) is a table showing a situation where the differential data is produced by comparing the comparison data with the object image data to be processed based on a fifth processing flow in the method shown in the process flow (A) of FIG. 3. FIG. 23 (B) is a table showing a situation where the differential data is produced by comparing the comparison data with the object image data to be processed based on the fifth processing flow in the method shown in the process flow (B) of FIG. 3.

FIG. 24 (A) is a table showing a situation where the newly restored image data is produced by allocating the newly produced differential data based on the fifth processing flow in the method shown in the process flow (A) of FIG. 3. FIG. 24 (B) is a table showing a situation where the newly restored image data is produced by allocating the newly produced differential data based on the fifth processing flow in the method shown in the process flow (B) of FIG. 3.

FIG. 25 (A) is a table showing restored image data in which object image data to be processed is ideally restored by repeating the process flow (A) of FIG. 3. FIG. 25 (B) is a table showing restored image data in which object image data to be processed is ideally restored by repeating the process flow (B) of FIG. 3.

DETAILED DESCRIPTION OF THE PRESENT INVENTION

Figure 1:
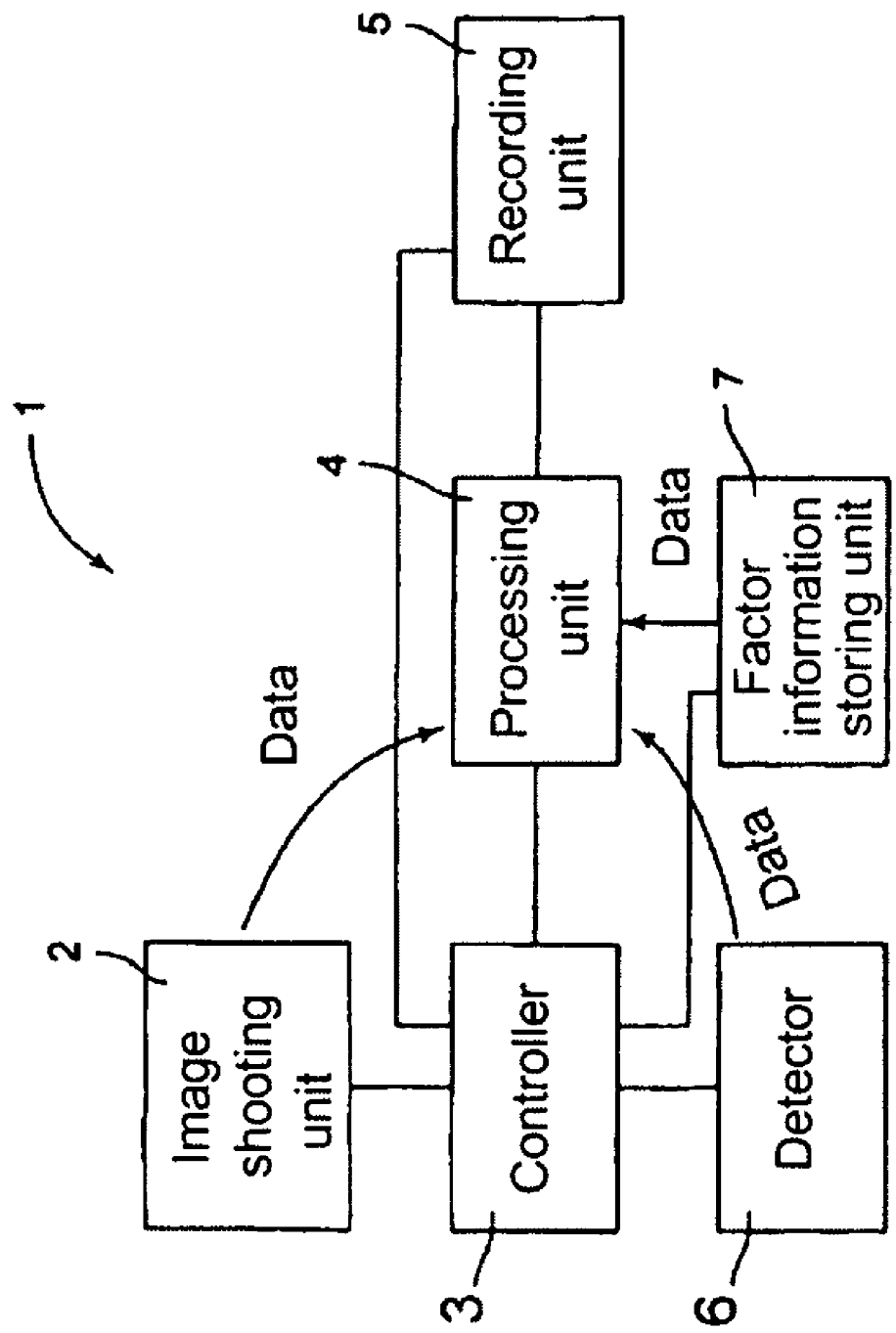
FIG. 1 is a block diagram showing main structures of an image processing device of an embodiment in the invention.

The following reference numerals are used in the following description of the present invention:
1: image processing device,
2: image shooting unit,
3: control unit,
4; processing unit,
5; recording unit,
6; detecting unit,
7; storing factor information unit,
Io: arbitrary image data (initial image data)
Io': comparison image data,
G: fluctuation-factor information data,
Img: original image,
Img'; shot image data (shot image)
H: feedback function,
$I_{o+n}$: restored image data, A signal processing device 1 according a first embodiment of the invention will be explained with referring to figures hereafter. The image processing device 1 is an so-called digital camera for consumer in which CCD is used as an image shooting unit, but also applied to cameras in which CCD is used as an image shooting unit for other use such as monitoring, TV, and an endoscope, and other devices except cameras such as a microscope, binoculars, and a diagnostic imaging apparatus like imaging with NMR.

The image processing device 1 comprises an imaging unit 2 for shooting an image such as a figure, a controller 3 for driving the imaging unit 2 and a processing unit 4 for processing an image (signal data) shot by the imaging unit 2. The image processing device 1 further comprises a recording unit 5 for recording an image processed by the processing unit 4, a detector 6 composed of an angular speed sensor, or the like for detecting fluctuation factor information, which is a main factor for an image deterioration, and a fluctuation-factor information storing unit 7 which stores the existed fluctuation-factor information causing an image deterioration and the like.

The imaging unit 2 is a part including an optical system for imaging and having lens and an imaging sensor for converting light passed through lenses into electrical signals such as CCD, C-MOS and the like. The controller 3 controls any units of the image processing device 1 such as the imaging unit 2, the processing unit 4, the recording unit 5, detecting unit 6 and a factor information storing unit 7.

The processing unit 4 includes an image processing processor composed of hardware such as application specific integrated circuit (ASIC.) The image processing unit 4 includes a recording unit not disclosed in the figure, and stores image data having high frequencies in a complex space regarding an image data to be processed described later, and image data as arbitrary image data which is base for forming comparison image data. The processing unit 4 may comprise software instead of hardware like ASIC. The recording unit 5 includes a semiconductor memory, but may include a magnetic recording means like a hard disk drive or an optical recording means like digital versatile disk (DVD.)

The detecting unit 6 is provided with two angular speed sensors, detecting the angular speed along X axis and Y axis perpendicular to Z axis, which is the optical axis of the image processing device 1 as shown in FIG. 2. Hand jiggling when shooting an image with a camera causes any movements along X, Y and Z directions and rotation along Z axis. But, in particular, rotations along X and Y axes receive the most impact of hand jiggling. A shot image is greatly blurred even if these rotations fluctuate slightly. Only two angular sensors are placed along X and Y axes in FIG. 2 in the embodiment due to the above reason. But, other angular sensor along Z axis and sensors detecting movement along X and Y directions may be added in order to get further accurate detection. A sensor may be an angler acceleration sensor instead of an angler velocity sensor.

The factor-information storing unit 7 is a recoding unit which records information regarding fluctuation factors such as already-known blur factors like aberration of optics and others. In the embodiment, the factor information storing unit 7 stores information of aberration of optics and lens distortion. But such information is not used for restoring a blurred image due to hand jiggling described later.

Next, a basic concept of the processing method of the embodiment will be explained referring to the process flow shown in FIG. 3 (A) (referred as the process flow (A) hereafter) and FIG. 4, and then a method processed by the above image processing unit 4 in the image processing device 1 will be explained.

In the process flow (A) of FIG. 3, "Io" is image data regarding an arbitrary image (arbitrary image data hereafter) which is image data recorded in advance in the recording unit of the image processing unit 4. "Io'" is fluctuated image data of the arbitrary image data Io, image data for comparing (comparison image data hereafter.) "G" is fluctuation-factor information data (=information about fluctuation factors (point spread functions)) detected by the detector 6 and stored by the recording unit in the processing unit 4. "Img'" is data of a shot image, fluctuated by fluctuation factors, and image data as an object to be processed (object image data to be processed hereafter.)

"δ" is a difference between the object image data to be processed Img' and the comparison image data Io'. "k" is an allocation ratio based on the fluctuation-factor information data G. "$I_{o+n}$" is a restored image data (restored data, hereafter) newly produced by allocating the differential data δ to the arbitrary image data Io based on the fluctuation-factor information data G. "Img" is intrinsic image data (original image data hereafter) before fluctuating, which is a base for the object image data to be processed Img'. Namely, "Img" is a shot image data which was shot under the situation where there is no fluctuation factor such as hand jiggling. Here the relationship between Img and Img' is assumed to be expressed as the following formula (1).

$$Img' = Img * G \quad (1)$$

Where, "*" is an operator which indicates convolution integration. Here, the differential data "δ" is generally varied depending on the fluctuation-factor information data G and expressed as the following formula (2), though the data may be a simple difference of a corresponded pixel.

$$\delta = f(Img', Img, G) \quad (2)$$

According to the process flow (A) in FIG. 3, first, the arbitrary image data Io is prepared as initial image data (step S101.) The initial image data Io as the arbitrary image data may be the object image data to be processed Img' as a shot image data or may be any image data having solid black, solid white, solid gray, check and the like. The comparison image data Io' as the fluctuated image is obtained by inputting the arbitrary image data Io to the formula (1) instead of Img in step S102. Next, the object image data to be processed Img' is compared with the comparison image data Io' and the differential data δ is calculated (step S103.)

Next, in step S104, it is judged whether the differential data δ is equal to or more than a predetermined value or not. Then, in step S105, a restored image data as a newly initial image data is produced if the differential data δ is equal to or more than a predetermined value. Namely, the restored image data $I_{o+n}$ is produced by allocating the differential data δ to the arbitrary image data Io based on the fluctuation-factor information data G. Then, steps S102, S103 and S104 are repeated while the restored image data $I_{o+n}$ being a newly initial image data.

In step S104, if the differential data δ is smaller than a predetermined value, the processing is completed (step S106.) Then, the restored data $I_{o+n}$ at the time of completing the processing is assumed to be a correct image, namely an original image data Img without deterioration. Then this correct data is recorded to the recording unit 5. Here, the recording unit 5 may record the arbitrary image data Io and the fluctuation-factor information data G and send it to the processing unit 4 if they are necessary.

The above processing method will be summarized as the followings. Namely, this method does not gain solutions as solving inversed issues, but gain solutions as optimizing issues to seek rational solutions. As disclosed in the patent document 2, solving inversed issues is theoretically possible, but faces difficulty in actual site.

Gaining solutions as optimizing issues needs the following premises: Namely,
(1) An output corresponding to an input is uniquely determined.
(2) If an output is the same, an input is the same.
(3) Processing is repeated while updating inputs in order to gain the same output so as to make a solution converge.

In other word, as shown in FIGS. 4 (A) and 4 (B), if the comparison image data Io' ($I_{0+n'}$) approximated to the object image data to be processed Img' is produced, the arbitrary image data Io which was an original data for producing the comparison image data or the restored image data $I_{0+n}$ becomes approximated to the original image data Img which was an original data for the object image data to be processed Img'.

Here, in the embodiment, the angular velocity sensor detects angular velocity every 5 μsec. The image data for each pixel is expressed as 8 bits from 0 to 255 corresponding to the amount of light which such pixel receives. When the data is "0", the optical energy is "0". When the data is "255", the amount of the optical energy which the pixel can receive becomes the maximum.

The data value as a standard for judging the differential data δ is "6" for example. If the differential data δ is smaller than 6 namely equal to or less than 5, the processing is completed. Row blurred data detected by the angular velocity sensor is not coincided with an actual blur if correcting the sensor is insufficient. Therefore, it is necessary to compensate the detected raw data such as multiplying it with a predetermined magnification in order to fit the actual blur when the sensor is not corrected.

Next, the details of the process flow (A) shown in FIG. 3 and the processing method shown in FIG. 4 will be explained with referring to FIGS. 5, 6, 7, 8, 9, 10, 11, and 12.

[Algorism for Reproducing Hand Jiggling]

When no hand jiggling, the optical energy corresponding to a predetermined pixel concentrates on the pixel during exposure. But when hand jiggling, the optical energy disperses to pixels blurred during exposure. Further, if the degree of hand jiggling during exposure is recognized, the way of dispersing the optical energy during exposure is also recognized. Therefore, it is possible for the recognition to produce a non blurred image from a blurred image.

Details will be explained as a horizontal one dimension for simplicity. Pixels are numbered as n−1, n, n+1, n+2, n+3 . . . from the left side in order. One pixel n is paid an attention. When no hand jiggling, the optical energy during exposure is concentrated into the pixel n, making the energy concentration become "1.0". This energy concentration is shown in FIG. 5. FIG. 6 is a table showing the result of shooting at this time, namely the shot result without hand jiggling. These results shown in FIG. 6 become the original image data Img without deterioration.

If there is an image blurred during the exposure time, it is assumed that the image on the pixel n is blurred during 50% of the exposure time, the image on the pixel n+1 is blurred during 30% of the exposure time and the image on the pixel n+2 is blurred during the rest of 20% of the exposure time. The way of dispersing the optical energy is shown in the table of FIG. 7. This dispersion becomes the fluctuation-factor information data G.

A blur is uniform on all pixels. If there is no upper blur (a vertical blur), the status of a blur is shown in the table of FIG. 8. The object image data to be processed Img' is an image data fluctuated from the original image data Img due to hand jiggling as the result of shooting. More specifically, the data value "120" at the "n−3" pixel follow the allocation ratio of the fluctuation-factor information data G, "0.5", "0.3" and "0.2". Hence, the data disperses into the "n−3" pixel by "60", the "n−2" pixel by "36", and the "n−1" pixel by"24". Similarly, the data value "60" of the "n−2" pixel is dispersed into the "n−2" pixel by "30", the "n−1" pixel by "18" and the "n" pixel by "12". The corrected-shot result without blur is calculated from the blurred image data Img' and the fluctuation-factor information data G shown in FIG. 7.

Any data can be applied to the arbitrary image data Io as the initial image data shown in step S101. But, the object image data to be processed Img" is used for it in this explanation. Namely, Io is assumed to be equal to Img' in the beginning. "Input Io" shown in the table of FIG. 9 corresponds to the arbitrary image data Io. In step S102, the fluctuation-factor information data G is applied to the arbitrary image data Io, namely the object image data to be processed Img'. More specifically, the data value "60" at the "n−3" pixel of the arbitrary image data Io, for example, is allocated to the "n−3" pixel by "30", the "n−2" pixel by "18" and the "n−1" pixel by "12". Other image data at other pixel is similarly allocated. Then, the comparison image data Io' is produced, being indicated as "output Io'". Therefore, the differential data δ in step S103 become values shown in the bottom of the table in FIG. 9.

Then the size of the differential data δ is judged in step S104. More specifically, if all values of the differential data δ are the absolute values and become equal to or less than 5, the processing is completed. But, the differential data δ shown in FIG. 9 is not matched to this condition, and then the processing moves to step S105. Namely, the restored data $I_{o+n}$ is produced by allocating the differential data δ to the arbitrary image data Io with using the fluctuation-factor information data G. The restored data $Io_{+1}$ is produced and indicated as a "next input" shown in FIG. 10. This case is first processing indicated as $I_{o+1}$ in FIG. 10 because of n=1.

The differential data δ is allocated by the following method. For example, if the pixel n−3 is paid an attention, "15" is allocated to the pixel n−3 by multiplying the data value "30" of itself with the allocation ratio 0.5. Then, "4.5" is allocated to the pixel n−2 by multiplying the data value "15" of the pixel n−2 with the allocation ratio 0.3 allocated to the pixel n−2. Further, "1.84" is allocated to the pixel n−1 by multiplying the data value "9.2" of the pixel n−1 with the allocation ratio 0.2 allocated to the pixel n−1. The total amount of data allocated to the "n−3" pixel become "21.34". The restored data $I_{o+1}$ is produced by adding the initial image data Io (the object image data to be processed Img' as a shot mage here) with this value. This restored image data $I_{o+1}$ corresponds to a "next input $I_{o+1}$" in the table of FIG. 10.

As shown in FIG. 11, the restored data $I_{o+1}$, the input $I_{o+1}$ becomes input image data (=the arbitrary image data Io) in step S102 for executing step 102. Then new differential data δ is obtained by proceeding step S103. The size of the new differential data δ is judged in step S104. If the data is larger than a predetermined value, the new differential data δ is allocated to the previous restored data $I_{o+1}$ so that the new restored data $I_{o+2}$ is produced. This restored image data $I_{o+2}$ corresponds to "next input $I_{o+2}$" in the table of FIG. 12. Then, a new comparison image data $I_{o+2'}$ is produced from the restored data $I_{o+2}$ by executing step S102. After step S102 and S103 are executed, step S104 is executed. Then, depending on the judgment in step S104, either step S105 or step S106 is executed. These processes are repeated.

Here, according to the basic concept of the image restoring method described above, the restored image is processed to be produced at the position where the exposure of an object image to be processed is started, namely at the position where shooting an image is started. Hence, if one looks at a restored image formed by restoring an object image to be processed, which is displayed as a shot image on a display, he/she sees a situation in which the restored image seems to be moved to a position where a blur of the an object image to be processed is started.

Regarding the aforementioned object image to be processed, the fluctuation-factor information data G are "0.5, 0.3, and 0.2". The exposure time of the object image to be processed becomes shortened along the direction of a blur. Namely, the object image to be processed is an image which gradually becomes dark along the direction of a blur. If the object image to be processed Img' is restored by the above processing method, one looks at a restored image seems to be located at the position where the exposure time is the longest and the exposure is started. Namely, one looks at a situation where the restored image seems to be restored in a bright area of the object image to be processed. Hence, even when one looks at the restored image produced from the blurred object image to be processed on a display, he/she feels it natural.

However, a blur during the exposure is allocated to the pixel n during the first 20% of the exposure time, the pixel n+1 during the next 30% of the exposure time, and the pixel n+2 during the final 50% of the exposure time. Then, one can feel it unnatural when he/she looks at a display where a restored image is produced from an object image to be processed, of which the fluctuation-factor information data G are "0.2, 0.3, and 0.5". Namely, the object image to be processed is an image of which brightness becomes higher from the position of starting a blur to the end position. Here, when the object image data to be processed Img' is restored by the above restoring method, the restored mage is produced at the position of exposure starting where the brightness of the object image data to be processed is low. Hence, when one looks at a display where a restored image is produced from object image data to be processed, he/she feels it unnatural because he/she gets lulled into illusion in which the restored image is produced at a position differing from the location where the intrinsic shot image is placed.

Hence, according to the embodiment of the invention, the restored image is produced while corresponding to a position where the fluctuation-factor information data G gets to be a maximum value regardless of the position of actual starting and ending exposure time for an object image to be processed, under the condition where the object image to be processed gets to be blurred toward the direction in which data values of the fluctuation-factor information data G become small from the maximum value.

This processing makes people feel a display natural when he/she looks at such display where the restored image is produced from the object image to be processed even if the position of starting exposure time for the object image to be processed is misaligned from the position where the fluctuation-factor information data G gets to be a maximum value. The reason is that the restored image is produced in the area where the brightness of the object image to be processed is the highest.

Detail processing will be explained referring to the process flow (B) shown in FIG. 3 (B), FIG. 13 and FIG. 14. The process flow (B) in FIG. 3 is different from the process flow (A) in FIG. 3 regarding contents in steps S102 and S105. Steps S102 and S105 in the process flow (A) are replaced with S102' and S105' respectively in the process flow (B). Steps S101, 103 and 104 in the process flow (B) are similar to that in the process flow (A) in FIG. 3.

Tables in each (B) from FIG. 15 to FIG. 24 (the table (B) hereafter) concretely shows contents processed in steps S102' and S105' of the process flow (B) in FIG. 3. Namely, tables in each (B) from FIG. 15 to FIG. 24 shows processes for restoring the object image to be processed Img' under the condition that a blur is occurred toward the direction from the pixel having the large data value of the fluctuation-factor information data G to the pixel having the small value of it.

The content processed in tables of (B) of FIGS. 15, 17, 19, 21 and 23 is the content processed in step S102' of the process flow (B) in FIG. 3. The content processed in tables of (B) of FIGS. 16, 18, 20, 22 and 24 is the content processed in step S105' of the process flow (B) in FIG. 3.

Tables in each (A) from FIG. 15 to FIG. 24 (table (A) hereafter) shows a process producing the restored image data $I_{o+n}$ at the position of starting exposure and is compared to in each (B) from FIG. 15 to FIG. 24. Namely, the content processed in tables of (A) of FIG. 15, 17, 19, 21 23 is the content processed in step S102 of the process flow (A) in FIG. 3. The content processed in tables of (A) of FIG. 16, 18, 20, 22, 24 is the content processed in step S105 of the process flow (A) in FIG. 3.

In this embodiment, the following case is explained. Namely, the original image data Img is allocated to only one pixel n for simplification. A blur is occurred in two pixels, namely n+1 and n+2 along the horizontal direction. The object image data to be processed Img' is restored when the fluctuation-factor information data G are "0.2, 0.3 and 0.5".

In other word, as shown in the table of FIG. 13, the way of the optical energy dispersion to pixels n, n+1, n+2 become 0.2, 0.3 and 0.5 respectively if the fluctuation-factor information data G due to a blur are "0.2, 0.3 and 0.5" under the premise where the optical energy concentration toward the pixel n is 1 if there is no blur. Further, as shown in FIG. 14, if the optical energy of the pixel n is 100, 30% of the optical energy of the pixel n is dispersed to the pixel n+1, 50% of it is dispersed to the pixel n+2 and 20% of it is retained in the pixel n according to the fluctuation-factor information data G. These get to be the object image data to be processed Img'. In other word, the object image data to be processed Img' includes optical energies of pixels n, n+1, n+2: 20, 30 and 50 respectively.

Such object image data to be processed Img' is processed according to the process flow (B) in FIG. 3. First, the process is started on the premise that the arbitrary image data Io is zero for simplification in step S101. Namely, a data value for each pixel is "0" in the beginning. The column for Io in the table (B) of FIG. 15 is "0". The fluctuation-factor information data G' is applied to the arbitrary image data Io in step S102'. The fluctuation-factor information data G' are produced as data at the time when a blur is occurred from the pixel having high optical energy dispersion to the pixel having low optical energy dispersion, based on the fluctuation-factor information data G "0.2, 0.3 and 0.5"

Namely, the fluctuation-factor information data G' are produced as data at the time when a blur is occurred from the pixels n, n−1 and n−2 though the fluctuation-factor information data G are data when a blur is occurred from the pixels n, n+1 and n+2. Accordingly, the content processed in step 102', which is a specific content when the fluctuation-factor information data G' is applied to the arbitrary image data Io=0, is the following:

The optical energy of the data at the pixel n−3 is allocated to the pixel n−3 of itself by 0.5. The optical energy of the data at the pixel n−2 is allocated to the pixel n−2 of itself by 0.5 and allocated to the pixel n−3 by 0.3. The optical energy of the data at the pixel n−1 is allocated to the pixel n−1 of itself by 0.5, allocated to the pixel n−2 by 0.3 and allocated to the pixel n−3 by 0.2. The optical energies of these data at the other pixels from n to n+4 are similarly allocated to the pixel itself and pixels on the left side by 0.5, 0.3 and 0.2 respectively in this order. In the table (B) of FIG. 15, all columns for the output Io' (the comparison image data Io'), produced by the application of the fluctuation-factor information data G' to it, become "0". In the table (B) of FIG. 15, it is uneasy to understand the specific content processed by the application of the fluctuation-factor information data G' to the arbitrary image data Io since the data value of the arbitrary image data Io is "0". The specific content processed by the application of the fluctuation-factor information data G' to the arbitrary image data Io will be explained in FIG. 17 (B) where the arbitrary image data Img' gets to be larger than "0".

Next, the differential data δ is calculated from the object image Img' to be processed (step S103.) The differential data δ is disclosed on the bottom columns of (B) in FIG. 15.

Here, the content processed in step 102 when the object image data to be processed Img' in FIG. 14 is processed in the process flow (A) of FIG. 3 will be explained referring to the table (A) in FIG. 15 for comparison. First, the process is started on the premise that the arbitrary image data Io is zero for simplification in step S101 similarly to the process flow (B) of FIG. 3. Namely, Io in the table (A) of FIG. 15 becomes 0. The fluctuation-factor information data G is applied to the arbitrary image data Io so as to be fluctuated in step S102. The fluctuation-factor information data G are data corresponding to a blurred track from the position of starting exposure to the position of ending exposure. The optical energy of the data at the pixel n−3 is allocated to the pixel n−3 of itself by 0.2, allocated to the pixel n−2 by 0.3 and allocated to the pixel n−1 by 0.5. The optical energy of the data at the pixel n−2 is allocated to the pixel n−2 of itself by 0.2, allocated to the pixel n−1 by 0.3 and allocated to the pixel n by 0.5. The optical energy of the data at the pixel n−1 is allocated to the pixel n−1 of itself by 0.2, allocated to the pixel n by 0.3 and allocated to the pixel n+1 by 0.5. The optical energies of the data at the other pixels from n to n+4 are similarly allocated to the pixel itself and pixels on the left side by 0.2, 0.3 and 0.5 respectively in this order. In the table (A) of FIG. 15, all columns for the output Io' (the comparison image data Io'), produced by the application of the fluctuation-factor information data G' to it, become "0" since the arbitrary image data Io is zero. In the table (A) of FIG. 15, it is uneasy to understand the specific content processed by applying the fluctuation-factor information data G to the arbitrary image data Io since the data value of the arbitrary image data Io is "0". The content in this process will be explained in FIG. 17 (A) where the value of the arbitrary image data Io is larger than "0". The bottom columns of the table (A) in FIG. 15 disclose the calculated results of the differential data δ between the object image data to be processed Img' and the comparison image data Io.

The size of the differential data δ is judged in step S104 when being back to the process flow (B) of FIG. 3. Then, a process is completed if the differential data δ gets to be equal to or less the predetermined absolute value. A process goes into step 105', the process indicated by the process flow (B) of FIG. 16 if the differential data δ does not get to be equal to or less the predetermined absolute value. The differential data δ is allocated by the following way in step S105'. For example, the pixel n+2 is paid an attention. "25" is obtained by multiplying "50", the data of the pixel n+2, with "0.5", the allocation ratio of itself, and then this value is allocated to the pixel n+2 of itself. "9" is obtained by multiplying "30", the data of the pixel n+1, with "0.3", the allocation ratio of itself, and then this value is allocated to the pixel n+1. "4" is obtained by multiplying "20", the data of the pixel n, with "0.2", the allocation ratio of the pixel n, and then this value is allocated to the pixel n. Accordingly, the total amount of data values allocated to the pixel n+2 becomes "38" Then, this total amount is added to the input Io, the initial image data (the arbitrary image data Io) so as to produce a next input $Io_{+1}$ (a restored image data $Io_{+1}$). The sum of allocated amounts from the pixel n−3 to n+4 is calculated and this sum is added to the arbitrary image data Io so as to produce the restored image data $Io_{+1}$. The calculated results are disclosed in the bottom columns of (B) of FIG. 16. The first process flow in the process flow (B) of FIG. 3 is completed here.

The content of allocating the differential data δ processed in step 105 in the process flow (A) of FIG. 3 will be explained referring to the table (A) in FIG. 16 for comparison. The differential data δ is allocated by the following way in step S105 of the process flow (A) in FIG. 3. For example, the pixel n is paid an attention. "4" is obtained by multiplying "20", the data of the pixel n, with "0.2", the allocation ratio of itself, and then this value is allocated to the pixel n itself. "9" is obtained by multiplying "30", the data of the pixel n+1, with "0.3", the allocation ratio of the pixel n+1, and then this value is allocated to the pixel n+1. "25" is obtained by multiplying "50", the data of the pixel n+2, with "0.5", the allocation ratio of the pixel n+2, and then his value is allocated to the pixel n+2. Accordingly, the total amount of data values allocated to the pixel n becomes "38". Then, this total amount is added to the input Io, the initial image data (the arbitrary image data Io) to produce a next input $Io_{+1}$ (a restored image data $Io_{+1}$). The sum of allocated amounts from the pixel n−3 to n+4 is calculated and this sum is added to the arbitrary image data Io to produce the restored image data $Io_{+1}$. The calculated results are disclosed in the bottom columns of (A) of FIG. 16. The first process flow in the process flow (A) of FIG. 3 is completed here.

Next, a second process flow of the process flow (B) in FIG. 3 is performed. In the second process flow, the arbitrary image data Io is the next input $Io_{+1}$ (the restored image data $Io_{+1}$) disclosed in the bottom columns of the table (B) in FIG. 16. Further, in the second process flow, the restored image data $Io_{+1}$ having a value except "0" is used as the data value of the arbitrary image data Io.

The content processed in step 102' in the process flow (B) of FIG. 3 was previously explained with referring to the table (B) of FIG. 15. It will be explained again in details referring to the table (B) in FIG. 17. The pixel n+2 is paid an attention. The data of the pixel n+2 is "38", the restored image data $Io_{+1}$ which is the initial image data based on the process results disclosed in the table (B) of FIG. 16. The optical energy of the data at the pixel n+2 is allocated to the pixel n+2 of itself by "19", the ratio of 0.5, and allocated to the pixel n+1 by "11.4", the ratio of 0.3. Further, the optical energy "7.6", the ratio of 0.2, is allocated to the pixel n. Similar processes are applied to other pixels to produce the comparison image data $Io_{+1'}$, the output data $Io_{+1'}$ disclosed in the table (B) of FIG. 17.

The second process flow in the process flow (A) of FIG. 3 is explained here for comparison. In the second process flow, the restored image data $Io_{+1}$ having a value except "0" is used as the data value of the arbitrary image data Io. The content processed in step S102 in the process flow (A) of FIG. 3 was previously explained referring to the table (A) of FIG. 15. It will be explained again in details referring to the table (A) in FIG. 17. The pixel n is paid an attention. The data of the pixel n is "38", the restored image data $Io_{+1}$ which is the initial image data based on the process results disclosed in the table (A) of FIG. 16. The optical energy "7.6", the ratio of 0.2, is allocated to the pixel n of itself, and the optical energy "11.4", the ratio of 0.3, is allocated to the pixel n+1. Further, the optical energy "19", the ratio of 0.5, is allocated to the pixel n+2. Similar processes are applied to other pixels to produce the comparison image data $Io_{+1'}$, the output data $Io_{+1'}$ disclosed in the table (A) of FIG. 17.

Then, the above similar processes are repeated hereafter in step S104 in each of process flows (A) and (B) of FIG. 3 until the differential data δ becomes equal to or less than the predetermined value. Namely, the tables (B) in FIGS. 17 and 18 show the content of the second process flow in the process flow (B) of FIG. 3. The tables (B) in FIGS. 19 and 20 show the content of the third process flow in the process flow (B) of FIG. 3. The tables (B) in FIGS. 21 and 22 show the content of the fourth process flow in the process flow (B) of FIG. 3. The tables (B) in FIGS. 23 and 24 show the content of the fifth process flow in the process flow (B) of FIG. 3. Further, if the process flow (B) of FIG. 3 is repeated, the restored image data $Io_{+n}$ approaches to the restored image data $Io_{+n}$ in which the data value of the pixel n+2 becomes 100 as shown in the table (B) of FIG. 25.

Namely, the tables (A) in FIGS. 17 and 18 show the content of the second process flow in the process flow (A) of FIG. 3. The tables (A) in FIGS. 19 and 20 show the content of the third process flow in the process flow (A) of FIG. 3. The tables (A) in FIGS. 21 and 22 show the content of the fourth process flow in the process flow (A) of FIG. 3. The tables (A) in FIGS. 23 and 24 show the content of the fifth process flow in the process flow (A) of FIG. 3. Further, if the process flow (A) of FIG. 3 is repeated, the restored image data $Io_{+n}$ approaches to the restored image data $Io_{+n}$ in which the data value of the pixel n becomes 100 as shown in the table (A) of FIG. 25.

Here, the dispersion of data about the restored image data $Io_{+n}$ produced in the process flow (A) of FIG. 3 is compared to the dispersion of data about the restored image data $Io_{+n}$ produced in the process flow (B) of FIG. 3 to obtain the following result. Namely, data values of the pixel n, n+1 and n+2 regarding the object image data to be processed Img' are "20", "30" and "50" respectively according to the direction of hand jiggling. The brightness of the position at the pixel n+2, the location of ending exposure, is higher than the brightness of the position at pixel n, the location of starting exposure.

Hence, the restored image data $Io_{+1}$ restored in the process flow (A) of FIG. 3 is an image where the brightness of the position at the pixel n+2, the location of ending exposure, is higher than the brightness of the position at the pixel n, the location of starting exposure. Further, the restored image data $Io_{+1}$ is restored as an image in which the brightness of the pixel n is high, and finally restored as the pixel n. The brightness of the pixel n is disclosed as the next inputs (restored images) $I_{o+1'}, I_{o+2'}, \ldots$ in the bottom columns of tables (A) in FIGS. 16, 18, 20, 22, 24 and 25. Accordingly, the object image data to be processed Img' of which the center brightness is located at the pixel n+2, is restored at the pixel n, giving a person unnatural feeling. Such person looks at a display where the restored image data $I_{o+n}$ is restored from the object image data to be processed Img'.

On the other hand, the restored image data $I_{o+n}$ is restored from the object image data to be processed Img' in the process flow (B) of FIG. 3. Further, the restored image data $I_{o+n}$ is produced as an image in which the brightness of the pixel n+2 is high, and finally restored to the pixel n+2. The brightness of the pixel n+2 is disclosed as the next inputs (restored images) $I_{o+1}, I_{o+2}, \ldots$ in the bottom columns of tables (B) in FIGS. 16, 18, 20, 22, 24 and 25. Accordingly, the restored image data $I_{o+n}$ is restored as an image from the object image data to be processed Img' of which the center brightness is located at the pixel n+2 giving a person natural feeling. Such person looks at a display where the restored image data $I_{o+n}$ is produced from the object image data to be processed Img'.

Hence, according to the embodiment of the invention, the object image data to be processed Img' is restored using the fluctuation-factor information data G' instead of the fluctuation-factor information data G. The fluctuation-factor information data G' is factor information where a blur is occurred toward the direction from the pixel having high optical energy allocation to the pixel having low optical energy allocation. Such image restoring process gives a person natural feeling, who looks at a display of producing a restored image even if the process restores the object image data to be processed (a shot image), of which the exposure time on the way to the blurred track or at the position of ending exposure is longer than the exposure time at the position of starting exposure.

Using the fluctuation-factor information data G' instead of the fluctuation-factor information data G means that the primitive points of the point spread function are converted into the position where the distribution of point images is concentrated at a maximum.

Here, in the process flow (B) of FIG. 3 described above, the restored image data $I_{o+n}$ may be approximated to be the original image data Img in step 104 by setting numbers of processes from steps S102 to S105 instead of judging the size of the differential data δ and performing the set numbers of processes. Namely, the numbers of processes may be set as being equal to or more than the numbers where the restored image data $I_{o+n}$ is estimated to be approximated to be the original image data Img. Such setting can obtain the restored image data $I_{o+n}$ without judging the size of the differential data δ. Further, when both judging the size of the differential data δ and judging base on the numbers of processes are available, the process may be halted if any one of them is satisfied. Here, if setting both is possible, judging the size of the differential data δ may be prioritized and the predetermined numbers of repeating the processing can be further repeated if the difference data does not become within the range of the reference value for judging by repeating predetermined numbers.

In the embodiment, information stored in the factor information storing unit 7 is not used. But, already-known deterioration-factor data such as optical aberration and lens distortion may be used. In this case, in the processing shown in the process flow (B) of FIG. 3, for example, it is preferable that processing be performed by combining hand jiggling information with optical aberration as deterioration information. Otherwise, an image may be stabilized by using optical aberration information after completing the processing with using hand jiggling information. Further, an image may be corrected or restored only by movement factors at the time shooting such as hand jiggling without setting the factor information storing unit 7.

Further, the above methods may be programmed. Further, programmed method may be stored in a recording medium such a compact disc (CD), DVD, and universal serial bus (USB) and enabled to be read by a computer. In this case, the image processing device 1 may include a means for reading the program stored in the medium. Further, programmed content may be input to a server out of the image processing device, down-loaded and used if it is necessary. In such case, the image processing device 1 may include a communication means down-loading the program stored in a medium.

In the embodiment, information stored in the factor information storing unit 7 is not used. But, already-known deterioration-factor data such as optical aberration and lens distortion may be used. In such case, for example, it is preferable that calculation be performed by combining hand jiggling information with optical aberration as one fluctuation factor information (deterioration factor information.) Otherwise, the calculation may be performed using the fluctuation-factor information data based on optical aberration information after completing the calculation with using the fluctuation-factor information data based on hand jiggling information. Further, an image may be restored by movement factors at the time of shooting such as the fluctuation-factor information data based on only hand jiggling without setting the factor information storing unit 7.

Further, the fluctuation factor information data G may include not only data of deterioration factors, but information simply varying an image or improving image quality on the contrary to deterioration. Further, angular velocity sensor detects an angular velocity every 5 μsec. for example. Row blurred data detected by the angular velocity sensor is not coincided with an actual blur if correcting the sensor is insufficient. Therefore, it is necessary to compensate the detected raw data such as multiplying it with a predetermined magnification in order to fit the actual blur when the sensor is not corrected.

The invention claimed is:

1. An image processing device comprising:
an image processing unit that produces a restored image approximated to an original image from an image to be processed, which is fluctuated against the original image due to movement of an image shooting device during exposure, wherein:
the image processing unit produces the restored image while making the restored image correspond to a position having a longest exposure time due to hand jiggling for an image to be processed;
the position having the longest exposure time is located at a pixel having a data value which is the largest of fluctuation-factor information data as a factor of fluctuating an image;
wherein the restored image is produced so as to approach an original image before fluctuating by repeating the following processes:
producing comparison image data from arbitrary image data by using the fluctuation-factor information data;
comparing the comparison image data with object image data to be processed thereafter;
producing restored data by allocating differential data to the arbitrary image data through using the data of fluctuation-factor information data, the differential data being a difference between the comparison data and the object image data to be processed; and
substituting the restored data for the arbitrary image data thereafter.

* * * * *